United States Patent
Xu et al.

(10) Patent No.: US 11,223,504 B2
(45) Date of Patent: *Jan. 11, 2022

(54) SYSTEM AND METHODS FOR MULTI-LEVEL SIGNAL TRANSMISSION

(71) Applicant: CABLE TELEVISION LABORATORIES, INC, Louisville, CO (US)

(72) Inventors: Mu Xu, Broomfield, CO (US); Zhensheng Jia, Superior, CO (US); Peng-Chun Peng, Atlanta, GA (US); Siming Liu, Atlanta, GA (US); Feng Lu, Atlanta, GA (US); Curtis Dean Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,398

(22) Filed: May 4, 2020

(65) Prior Publication Data

US 2020/0267031 A1   Aug. 20, 2020

Related U.S. Application Data

(63) Continuation of application No. 16/116,802, filed on Aug. 29, 2018, now Pat. No. 10,644,908.

(Continued)

(51) Int. Cl.
*H04B 1/38* (2015.01)
*H04L 25/03* (2006.01)
*H04B 10/54* (2013.01)
*H04B 10/50* (2013.01)
*H04L 25/06* (2006.01)
*H04B 10/69* (2013.01)

(52) U.S. Cl.
CPC ..... *H04L 25/03834* (2013.01); *H04B 10/503* (2013.01); *H04B 10/54* (2013.01); *H04B 10/541* (2013.01); *H04B 10/6971* (2013.01); *H04B 10/6972* (2013.01); *H04L 25/03006* (2013.01); *H04L 25/068* (2013.01)

(58) Field of Classification Search
CPC ......... H04L 25/03834; H04L 25/03006; H04L 25/068; H04B 10/541; H04B 10/6972; H04B 10/6971; H04B 10/503; H04B 10/54

See application file for complete search history.

(56) References Cited

U.S. PATENT DOCUMENTS 8,553,521 B2   10/2013   Zhang et al.
10,389,414 B1 *   8/2019   Qi .......................... H02J 50/23
(Continued)

*Primary Examiner* — Dhaval V Patel
(74) *Attorney, Agent, or Firm* — Armstrong Teasdale LLP

(57) ABSTRACT

An optical network includes a transmitter portion configured to (i) precode an input digitized stream of symbols into a precoded symbol stream, (ii) pulse shape the precoded symbol stream with an eigenvalue channel matrix, and (iii) transmit the pulse shaped symbol stream over a digital optical link. The optical network further includes a receiver portion configured to (i) recover the pulse shaped symbol stream from the digital optical link, (ii) decompose eigenvalues of the eigenvalue channel matrix from the recovered symbol stream, and (iii) decode the decomposed symbol stream into an output symbol stream.

18 Claims, 17 Drawing Sheets

Related U.S. Application Data

(60) Provisional application No. 62/551,476, filed on Aug. 29, 2017, provisional application No. 62/573,769, filed on Oct. 18, 2017.

(56) References Cited

U.S. PATENT DOCUMENTS

| | | | |
|---|---|---|---|
| 10,491,261 B1* | 11/2019 | Al-Eidan | H04L 27/18 |
| 2003/0185310 A1* | 10/2003 | Ketchum | H04L 25/03343 |
| | | | 375/259 |
| 2004/0141548 A1* | 7/2004 | Shattil | H04L 27/0004 |
| | | | 375/146 |
| 2007/0024521 A1 | 2/2007 | Inatsugu et al. | |
| 2007/0025421 A1* | 2/2007 | Shattil | H04B 10/25752 |
| | | | 375/136 |
| 2009/0285325 A1* | 11/2009 | Zhou | H04L 27/2608 |
| | | | 375/267 |
| 2014/0037029 A1* | 2/2014 | Murakami | H04L 25/03949 |
| | | | 375/340 |
| 2016/0308697 A1* | 10/2016 | Gattami | H04L 25/497 |
| 2017/0005789 A1* | 1/2017 | Chan | H04B 10/50 |
| 2017/0180055 A1* | 6/2017 | Yu | H04B 10/6163 |
| 2019/0074874 A1 | 3/2019 | Obara et al. | |
| 2019/0115963 A1 | 4/2019 | Zhu et al. | |

* cited by examiner

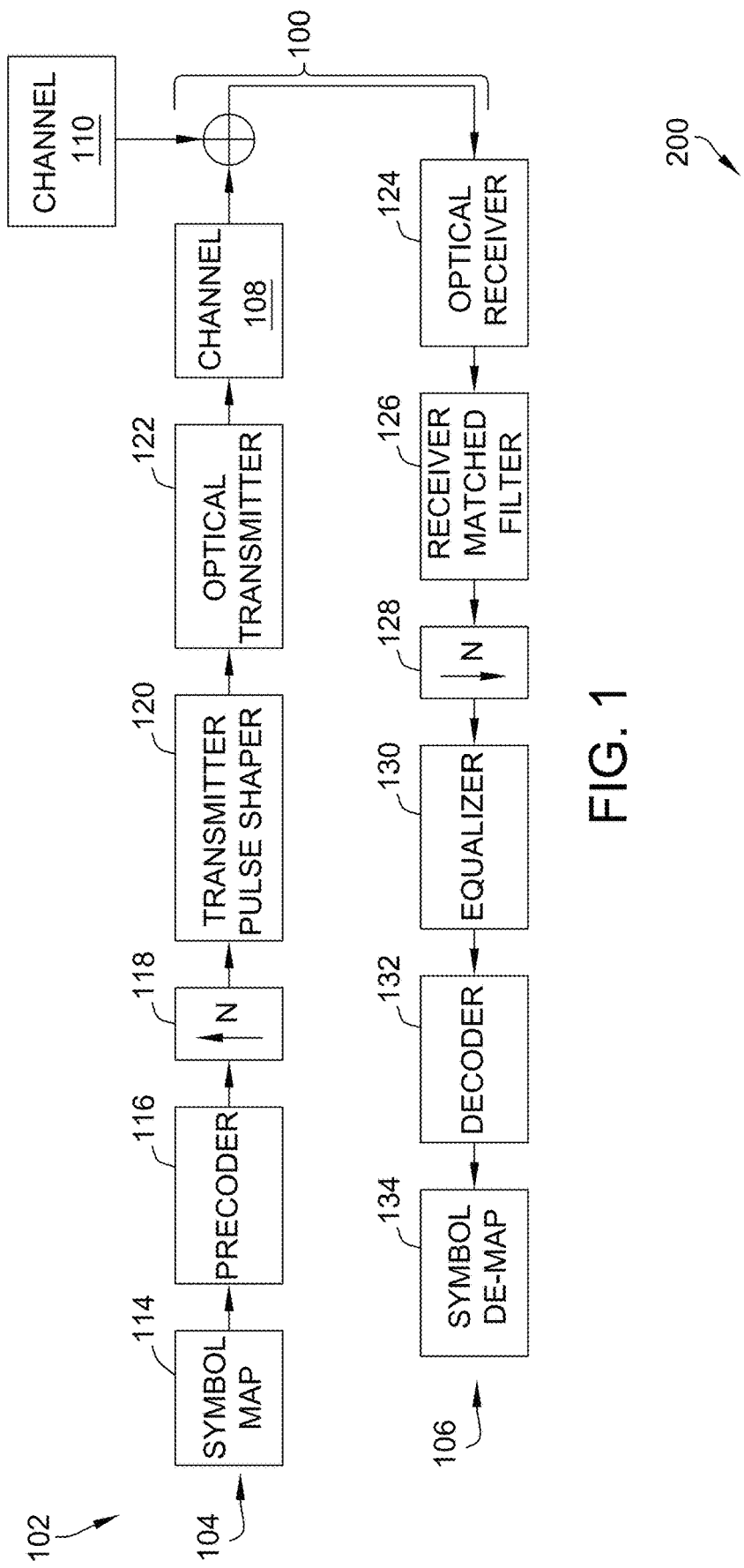
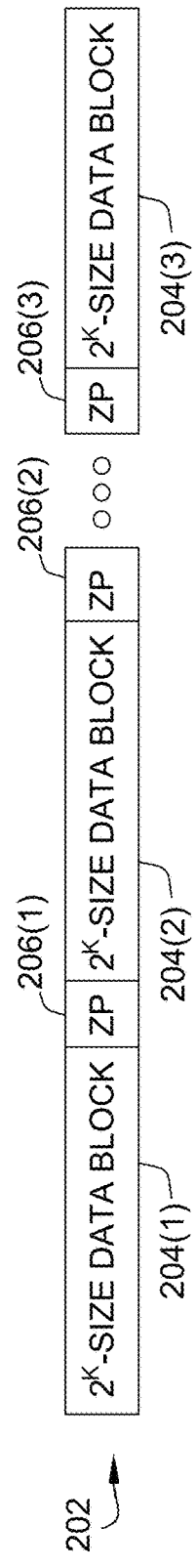
FIG. 1
FIG. 2

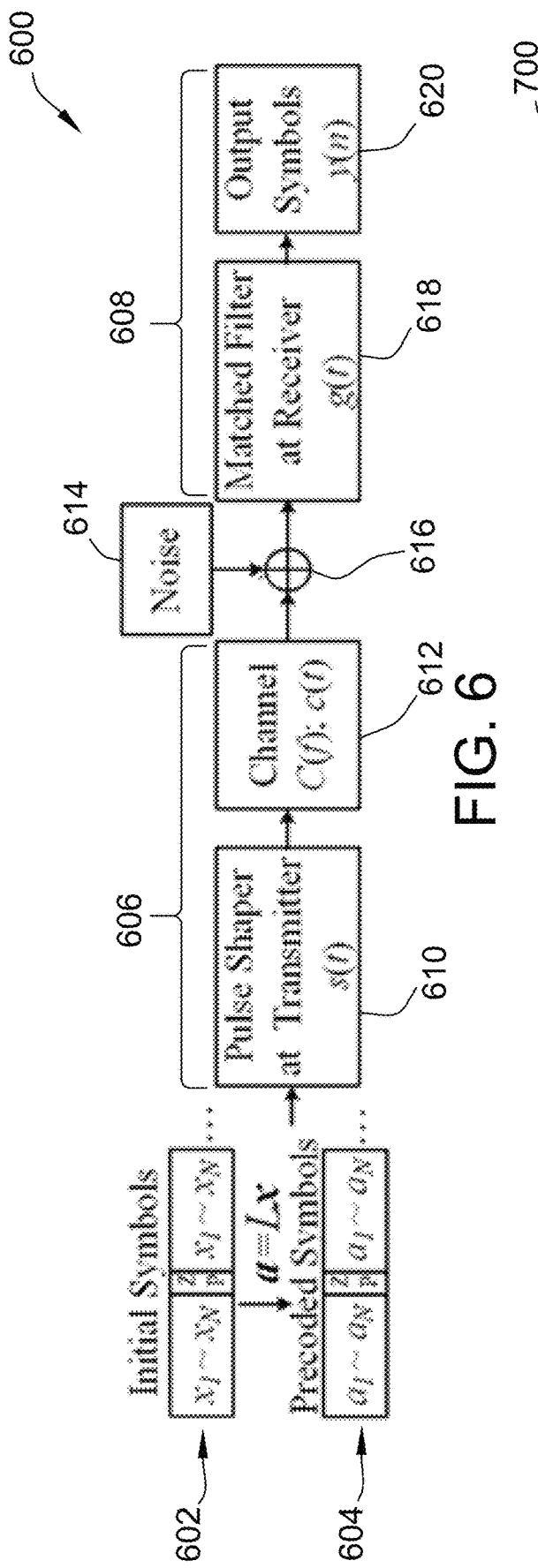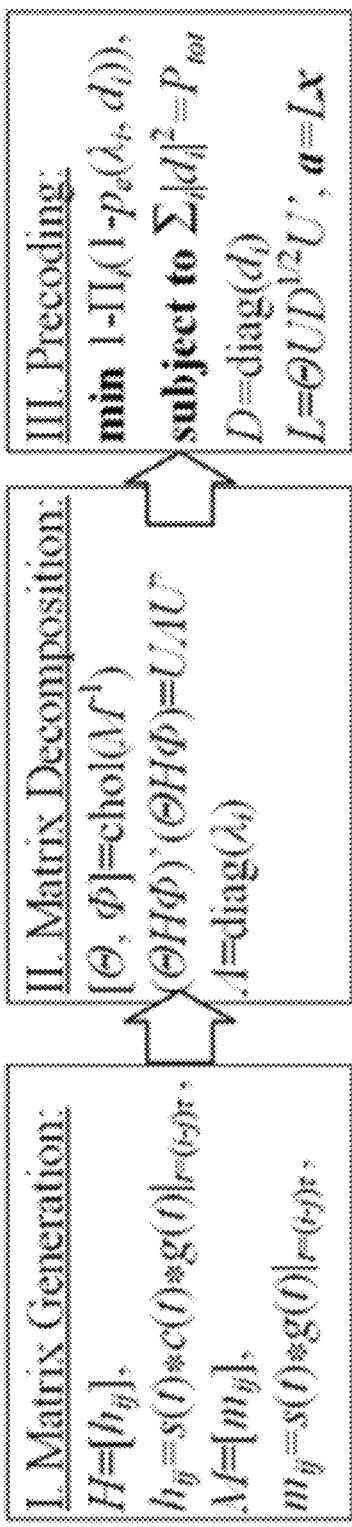
FIG. 6
FIG. 7

SYSTEM AND METHODS FOR MULTI-LEVEL SIGNAL TRANSMISSION

CROSS REFERENCE TO RELATED APPLICATIONS

This application is a continuation of U.S. patent application Ser. No. 16/116,802, filed Aug. 29, 2018, which application claims the benefit of and priority to U.S. Provisional Patent Application Ser. No. 62/551,476, filed Aug. 29, 2017, and U.S. Provisional Patent Application Ser. No. 62/573,769, filed Oct. 18, 2017. The disclosures of each of these prior applications are incorporated herein by reference in their entireties.

BACKGROUND

The field of the disclosure relates generally to optical communication systems and networks, and more particularly, to faster-than-Nyquist modulation for optical systems and networks.

Conventional hybrid fiber-coaxial (HFC) architectures deploy long fiber strands from an optical hub to a fiber node, and typically many short fiber strands to cover the shorter distances from the HFC nodes to a plurality of end users. Conventional Multiple Service Operators (MSOs) offer a variety of services, including analog/digital TV, video on demand (VoD), telephony, and high speed data internet, over these HFC networks, which utilize both optical fibers and coaxial cables, and which provide video, voice, and data services to the end user subscribers. The HFC network typically includes a master headend, and the long optical fiber carries the optical signals and connects the link between the headend, the hub, and the fiber node. Conventional HFC networks also typically include a plurality of coaxial cables to connect the fiber nodes to the respective end users, and which also carry radio frequency (RF) modulated analog electrical signals.

The HFC fiber node converts optical analog signals from the optical fiber into the RF modulated electrical signals that are transported by the coaxial cables to the end users/subscribers. Some HFC networks implement a fiber deep architecture, and may further utilize electrical amplifiers disposed along the coaxial cables to amplify the RF analog signals. In the conventional HFC network, both the optical and electrical signals are in the analog form, from the hub all the way to the end user subscriber's home. Typically, a modem termination system (MTS) is located at either the headend or the hub, and provides complementary functionality to a modem of the respective end user.

The continuous growth of optical intra/inter-data-center link, 5G mobile fronthaul and backhaul, next-generation distributed HFC architectures and access networks, passive optical networks (PONs), and high-speed optical short-reach transmission systems with advanced multi-level modulation formats require an equivalent growth in the development of advanced digital multi-level modulation formats to process the vastly increased amount of data transmitted over the various networks. Presently, conventional deployments of 1G/10G PON systems using nonreturn to zero (NRZ) modulation are unable to meet the growing capacity demand to deliver future high-speed data and video services.

Pulse-amplitude-modulation (PAM) with four levels (PAM-4), using either eight or four wavelengths with 50 or 100 Gbps per lane, has been recently considered as one solution in the baseline of IEEE P802.3bs 200G/400G Ethernet standard. Optical four-level PAM-4 and eight-level PAM-8 modulation schemes have also been recently proposed for 100G and 400G long-haul transmission networks and intra/inter-datacenter connects. However, these proposed PAM implementations will introduce several technical challenges. For example, it is difficult to discontinuously upgrade existing systems from PAM-$2^K$ to PAM-$2^{K+1}$, due to existing bandwidth and receiver sensitivity limitations. In another example, in back-to-back (B2B) transmission, changing from NRZ to PAM-4 will result in an approximately 4-dB system margin degradation, and similar when changing from PAM-4 to PAM-8. Additionally, other factors, such as chromatic dispersion and increased peak-to-average-power ratio (PAPR), may further degrade the transmission.

The requirements of conventional optical network system are presently unable to accommodate the jump from one modulation format to another, and both NRZ-based and PAM-based systems presently lack the flexibility to fully utilize the system capacity. A significant performance gap exists that greatly increases the complexity between different PAM formats, rendering a switch from one PAM format to another even further challenging and expensive. Thus, simply increasing the order of modulation has not proven to be a power-efficient and sustainable solution.

Other proposals for cost efficiency and low power consumption consider employment of existing 10-GHz or 20-GHz-bandwidth components. However, this proposal creates the separate challenge presented by the severe inter-symbol interference (ISI) that occurs due to bandwidth constraints by operation at higher baud rates. Linear pre-equalization (PE) has been proposed to mitigate such impairments, but PE is not optimal because of the resulting sacrifice to the system dynamic range and overall signal performance. Furthermore, the experienced equalizer effect is worsened by the presence of non-white Gaussian noise at the bandwidth-limited receiver with matched filtering detection.

Instead of increasing the modulation levels, other technical proposals increase the transmitted symbol rate to be faster than the channel Nyquist limit, which is also referred to as faster-than-Nyquist (FTN) signaling. Conventional FTN techniques are limited by the complex processing necessary to deal with the cumbersome ISI that occurs. Some conventional equalizers and coding techniques address more severe cases ISI, so that the benefit from the increase in the data rate (i.e., beyond Nyquist) outweighs the potential information loss incurred by FTN-induced ISI. Some techniques increase the symbol clock frequency rather than discontinuously multiplying the discrete amplitude levels, to performance gap and more fully utilize the system margin with high scalability.

Some conventional FTN systems, under the influence of narrow-filtering (NF) effect, are modeled with a symbol rate significantly faster than its root-mean-square (RMS) bandwidth, and different digital-signal-processing (DSP) techniques have been proposed in these conventional FTN systems. Maximum-likelihood-sequence estimation (MLSE) and Bahl Cocke Jelineck Raviv (BCJR) decoders have been used to estimate channel memory states among multiple neighboring symbols.

MLSE-based techniques (e.g., including poly-binary shaped FTN systems) use an algorithm to counter FTN system ISI impairments. The algorithm considers multiple neighboring symbols to calculate the Euclidean distance and soft MLSE decision through Trellis searching, in order to improve the performance of the forward error correction (FEC). However, these techniques have been limited due to the phenomenon of adaptive-filter-convergence failures observed in experimental systems (e.g., FTN-DP-16QAM), in part caused by the insufficient memory length under severe ISI. Furthermore, when ISI coefficients from more than two adjacent symbols are involved, the complexity of the corresponding Trellis table will also increase significantly, rendering the technique very difficult to implement in real systems, which is really hard to implement in the real systems.

BCJR-based techniques utilize an algorithm for an FTN receiver based on a Viterbi equalizer. The algorithm estimates the channel memory states and calculates the log likelihood ratio (LLR) of the information bits. However, such BCJR-based systems rely solely on post processing, and therefore experience significantly high computational complexity at the receiver. Similar to MLSE-based techniques, the complexity of BCJR will also significantly increase with a large channel memory depth. Tomlinson-Harashima precoding (THP)-based FTN scheme schemes use an algorithm that allows the system to trade-off the increased ISI into symbol constellation expansion, which eliminate the complex maximal likelihood search operation as in MLSE and BCJR. However, the resulting PAPR of the system using THP is increased, while power efficiency is decreased. Additionally, according to these THP techniques, training symbols lose their deterministic location on the constellation, which causes training-based adaptive algorithms to fail.

Therefore, as ISI increases, the complexity and memory requirements of Trellis searching and other FTN techniques expand significantly, thereby significantly increasing the cost and power consumption of the system. Additionally, all of these conventional FTN techniques are based on fixed-symbol-rate architectures which do not fundamentally differentiate the systems in which they are employed from different conventional fixed-rate multilevel modulated systems. Accordingly, it is desirable to create FTN systems and methods that are more economically feasible for existing and developing optical networks, and which consume power more efficiently.

BRIEF SUMMARY

In an embodiment, an optical network includes a transmitter portion configured to (i) precode an input digitized stream of symbols into a precoded symbol stream, (ii) pulse shape the precoded symbol stream with an eigenvalue channel matrix, and (iii) transmit the pulse shaped symbol stream over a digital optical link. The optical network further includes a receiver portion configured to (i) recover the pulse shaped symbol stream from the digital optical link, (ii) decompose eigenvalues of the eigenvalue channel matrix from the recovered symbol stream, and (iii) decode the decomposed symbol stream into an output symbol stream.

In an embodiment, a precoding method is provided for a digitized signal over a communication channel. The digitized signal includes a series of transmitted symbols having a Gaussian distribution of symbol amplitude values. The method includes steps of generating a channel matrix for the series of transmitted symbols based upon a time response of the communication channel, decomposing the communication channel into a plurality of orthogonal subsets, and precoding the digitized signal according to an eigenvalue distribution of the channel matrix and the plurality of orthogonal subsets.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a schematic illustration of an architecture of a faster-than-Nyquist transmission system, according to an embodiment.

FIG. 2 illustrates an exemplary frame structure for data symbols processed by the system depicted in FIG. 1.

FIG. 6 is a schematic illustration of an architecture of a linear time-invariant model, according to an embodiment.

FIG. 7 is a flow diagram for an exemplary precoding process for the architecture depicted in FIG. 6.

Figure 3:
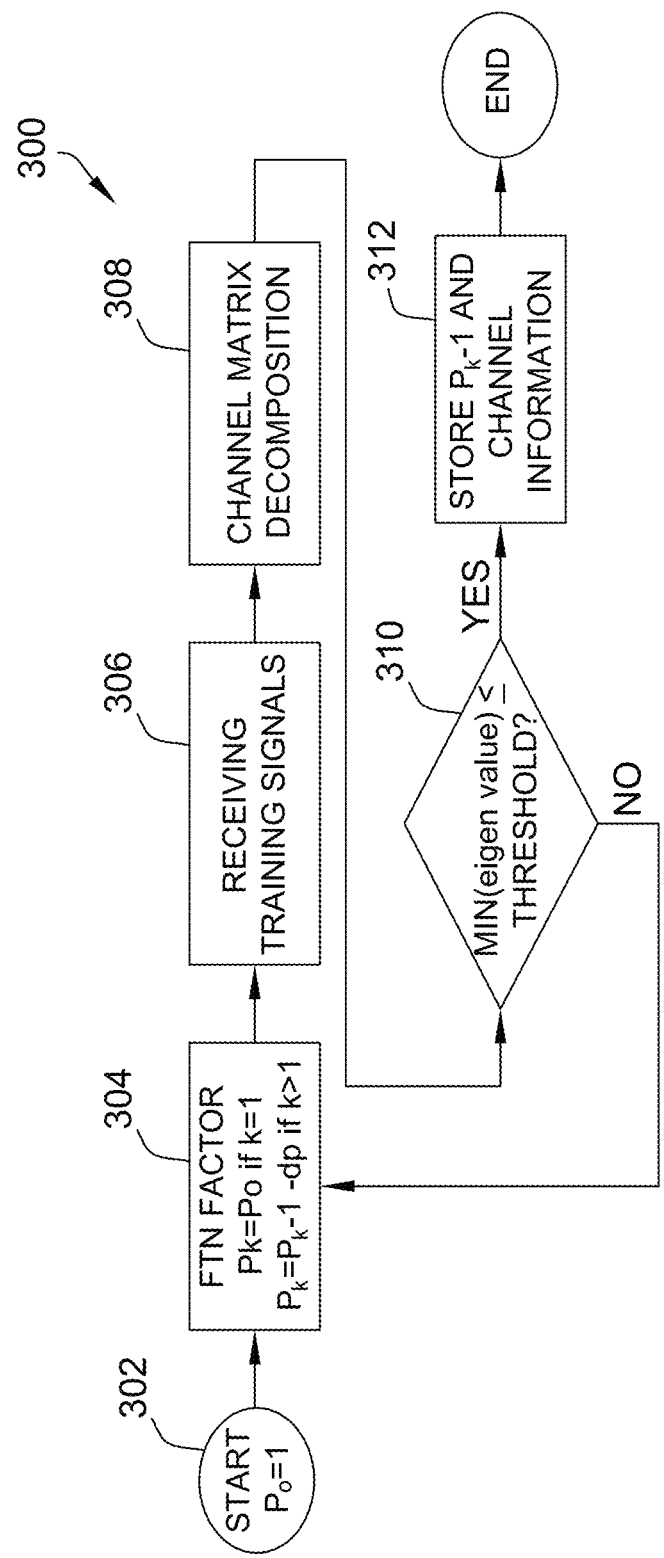
FIG. 3 is a flow diagram for an exemplary symbol rate adaptation process for the architecture depicted in FIG. 1.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

According to the embodiments described herein, an FTN scheme may be advantageously based on blockwise DSP and/or eigenvalue analysis of a channel matrix. Using the channel condition and the noise level of the system, the corresponding baud rate may be adaptively adjusted (e.g., through training) to maximize the system capacity without having to increase the modulation level(s) of the transmission. These blockwise processing techniques further serve to limit the severe ISI-induced error propagation within a boundary of each processed block. In an exemplary embodiment, further using precoding and decoding techniques (e.g., including look-up tables), the need is eliminated, at the receiver site, for a complex computational maximum likelihood searching algorithm.

In some embodiments, the NF effect in FTN systems is addressed by implementing eigenvalue-space precoding (EVSP), which significantly improves the bandwidth efficiency, but may advantageously utilize low-bandwidth devices. As described further herein, the present implementation of EVSP achieves minimum BER (MBER) "waterfilling" over the channel frequency response, with approximately a 2-dB improvement in receiver sensitivity. Additionally, according to the decoding techniques described herein, ISI is effectively mitigated after decoding at the receiver, such that both a decision-directed least-mean-square (DD-LMS) equalizer and a truncated MLSE are able to compensate for residual ISI, and with reduced complexity.

In the embodiments described further below with respect to the several figures, selected experimental data is provided for illustrative purposes, and not in a limiting sense. Some of the data below, for example, illustrates results using an optical intensity modulation direct detection (IMDD) transmission system, over 24-Gbps, 60-Gbps, and 120-Gbps PAM-4 testbeds, having 6-dB system electrical bandwidths of 4 GHz, 7.5 GHz, and 17.5 GHz respectively. In the illustrative examples herein, the transmission distance described with respect to ranges from 2-km to 30-km, using standard single mode fiber (SSMF). Other examples described herein include 4×100G wavelength division multiplexing (WDM) PAM-4 systems implementing the present precoding techniques.

FIG. 1 is a schematic illustration of an architecture 100 of an FTN transmission system 102. Architecture 100 may be implemented as one or more discrete hardware components, as a system of individual software modules, or as a combination thereof. In an exemplary embodiment, architecture 100 includes a preliminary stage 104 and a secondary stage 106. Preliminary stage 104 may operate, for example, with respect to a first channel 108, which may then be combined with one or more second channels 110 at a combiner 112 prior to processing by secondary stage 106.

Primary stage 104 includes one or more of a symbol mapping unit 114, a precoding unit 116, a first sampling unit 118, a pulse shaping unit 120, and an optical transmitter 122. In an exemplary embodiment, first sampling unit 118 is an up-sampler, pulse shaping unit 120 is a transmitter pulse shaper, and optical transmitter 122 includes a digital-to-analog converter (DAC) (not shown in FIG. 1). In some embodiments, a DAC may be included at first channel 108.

In exemplary operation of preliminary stage 104 of architecture 100, data symbols are symbol-mapped by symbol mapping unit 114, and then precoded by precoding unit 116 into a data bit-stream including PAM-modulated symbols (described further below with respect to FIG. 2). The precoded symbols from precoder 116 may then be oversampled by up-sampler 118 (e.g., by a factor of N), and filtered by a transmitter pulse shaper 120. The filtered symbols are received at the DAC in at least one of optical transmitter 122 and channel 108, and then modulated onto an optical light signal, which may then be transmitted, over a transmission distance, for processing by a second stage 106, alone or in combination with optical signals from other channels 110 (e.g., combined at combiner 112). The transmission distance may, for example, vary between distances of 1-40 km in most applications, but other transmission distances are within the scope of these embodiments.

Secondary stage 106 may include one or more of an optical receiver 124, a matched filter 126, a second sampling unit 128, and equalizer unit 130, a decoding unit 132, and a symbol demapping unit 134, and generally processes transmissions received from preliminary stage 104 in a substantially reverse order. In the exemplary embodiment, optical receiver 124 includes a photodetector (PD) and analog-to-digital converter (ADC) (not shown in FIG. 1), matched filter 126 is a receiver digital matched filter, and second sampling unit 128 is a down-sampler.

In exemplary operation of secondary stage 106, after the transmitted signal is received at optical receiver 124 (e.g., by a PD thereof) and sampled (e.g., by an ADC thereof), digital matched filter 128 is configured to shape the signal and suppress out-of-band (OOB) noise. The shaped signal may then be down-sampled by second sampling unit 128. Equalizer 130 is configured to apply a minimum mean square error (MMSE) algorithm to the down-sampled signal for channel equalization, and data blocks (e.g., FIG. 2, below) may be extracted and decoded by decoder 132. After decoding, at symbol demapping unit 134, the original data sequence (e.g., of preliminary stage 104) may then be recovered. More specifically, at preliminary stage 104, processing of an input signal stream is initiated by mapping the input data bit-stream (e.g., by symbol mapping unit 114) into PAM-modulated symbols. In an exemplary embodiment, and for ease of explanation regarding the following descriptions of matrix processing, the mapped data symbols may be arranged as described further below with respect to FIG. 2.

FIG. 2 illustrates an exemplary frame structure 200 for data symbols 202 processed by system 100, FIG. 1. In an exemplary embodiment, frame structure 200 is arranged as a sequence of data blocks 204 and zero paddings (ZPs) 206 inserted periodically between adjacent data blocks 204 as regards to prevent propagation of ISI-induced errors across the blocks. In this example, each data block 204 includes $2^K$ data symbols therein.

In some cases, frame structure 200 may effectively limit ISI propagation within each data block 204 and thereby simplify the memory states of the respective channel. Accordingly, for a relatively static channel state of a wired transmission system, the techniques illustrated in FIGS. 1 and 2 advantageously enable implementation of a matrix-based or look-up table-based precoding/decoding operation (e.g., at precoder 116/decoder 132) that will significantly reduce the complexity of the processing algorithms, and comparison with conventional multi-chain Viterbi or MLSE-like techniques that are performed over entire data streams having practically infinite lengths.

For example, respective time responses of pulse shaper 120, channel 108, and matched filter 126 are denoted herein as s(t), c(t), and g(t)=s*(T−t). Accordingly, in the case where system 100 is characterized by a linear time-invariant (LTI) model denoting input symbols as x and output symbols as y within each data block 204 the relationship of output symbols y to input symbols x may be represented by:

$$y=Hx+z \qquad (Eq.\ 1)$$

where H represents the LTI channel matrix of individual elements $h_{ij}$, z is an additive-white-Gaussian-noise (AWGN) vector, and where x represents the linearly precoded (e.g., by precoder 116) vector of the original PAM-modulated sequence, a, which may be expressed as x=La, where L is derived using an appropriate algorithm, such as Cholesky factorization. Each element $h_{ij}$ may thus be represented according to:

$$h_{ij}=s(t)*c(t)*g(t)|_{t=(i-j)\Delta t} \qquad (Eq.\ 2)$$

Similarly, the LTI channel matrix without considering c(t) may be denoted as Φ, with:

$$\Phi_{ij}=s(t)*g(t)|_{t=(i-j)\Delta t} \qquad (Eq.\ 3)$$

In the case where the algorithm used implements Cholesky factorization, $\Phi=PP^T$ and $L=(P^T)^{-1}$. As described above, a key difference between FTN transmission systems and conventional PAM systems is that the data rate of the FTN transmission systems may be gradually increased beyond the Nyquist limit to maximize the system capacity, whereas conventional PAM systems increase the data rate only by steps.

FIG. 3 is a flow diagram for an exemplary symbol rate adaptation process 300 for architecture 100, FIG. 1. In an exemplary embodiment, process 300 utilizes frame structure 200, FIG. 2, and performs symbol rate adaptation based on an eigenvalue analysis of FTN system 102.

Process 300 begins at step 302, in which an FTN factor ρ is initially set to a value of 1, such that $\rho_0=1$. In step 304, the FTN factor ρ is updated (e.g., by checking the eigenvalue distribution, described further below), such that, at a k iteration (e.g., k is an iterative factor), the FTN factor $\rho_k$ is set such that $\rho_k=\rho_0$, where k=1, and $\rho_k=\rho_{k-1}$, where k>1. In step 306, process 300 receives training signals that are capable of deterministic location on a corresponding constellation. Using the training signal obtained in step 306, process 300 proceeds to step 308, in which channel matrix decomposition is performed. In an exemplary embodiment of step 308, channel matrix decomposition is performed as singular-value decomposition (SVD) to obtain factorization of a real or complex channel matrix H.

Step 310 is a decision step. In step 310, process 300 determines if a minimum eigenvalue is less than or equal to a threshold value (e.g., a predetermined value). If process 300 determines that the minimum eigenvalue is greater than the threshold value, process 300 returns to step 304, where substantially all of process 300 is repeated. If, however, in step 310, process 300 determines that the minimum eigenvalue is less than or equal to the threshold value, process 300 proceeds to step 312, in which the channel information, as well as the value for $\rho_{k-1}$, are stored. Through this innovative technique, process 300 enables the system to continuously check the eigenvalue distribution and update the FTN factor ρ, and thereby advantageously enable full use of the system margin to reach the maximum FTN rate.

In an exemplary embodiment of process 300, the channel matrix H is generated using one or more algorithms, such as MMSE and/or a constant modulus algorithm (CMA), to estimate the channel information. In some embodiments, the channel matrix H is a non-singular sparse matrix, and thus different algorithms may be implemented to accelerate processing speed of the matrix factorization. In the case of a wired transmission system having a stable channel condition, the training techniques of process 300 may be executed less frequently, thereby further preventing significant delay increases in the transmission.

According to process 300, by implementing, for example, SVD decomposition, the eigenvalues of the channel matrix H may be readily obtained. In further operation of process 300, the resulting eigenvalue distributions may be further processed by a pulse-shaping filter (e.g., pulse shaper 120, FIG. 1), as described below with respect to FIGS. 4A-C (square-root raised-cosine (SRRC) function) and 5A-C (Gaussian function).

Figure 4A:
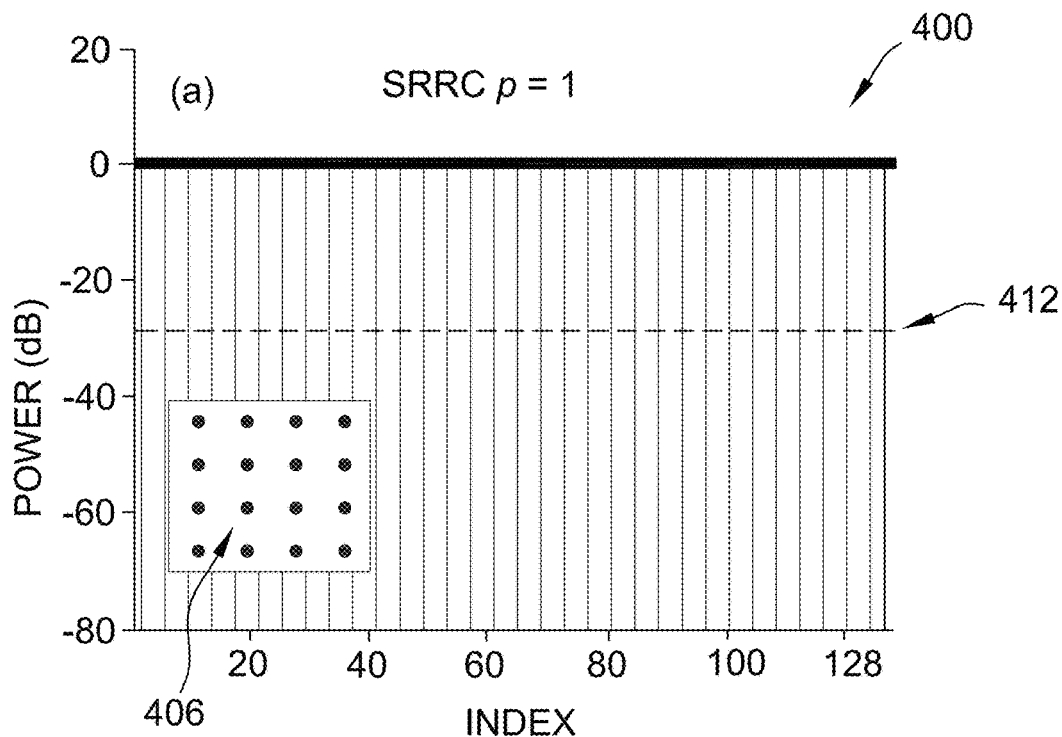
FIGS. 4A-C are graphical illustrations depicting eigenvalue distributions obtained from the pulse-shaping filter depicted in FIG. 1, using a square-root raised-cosine function.
Figure 4B:
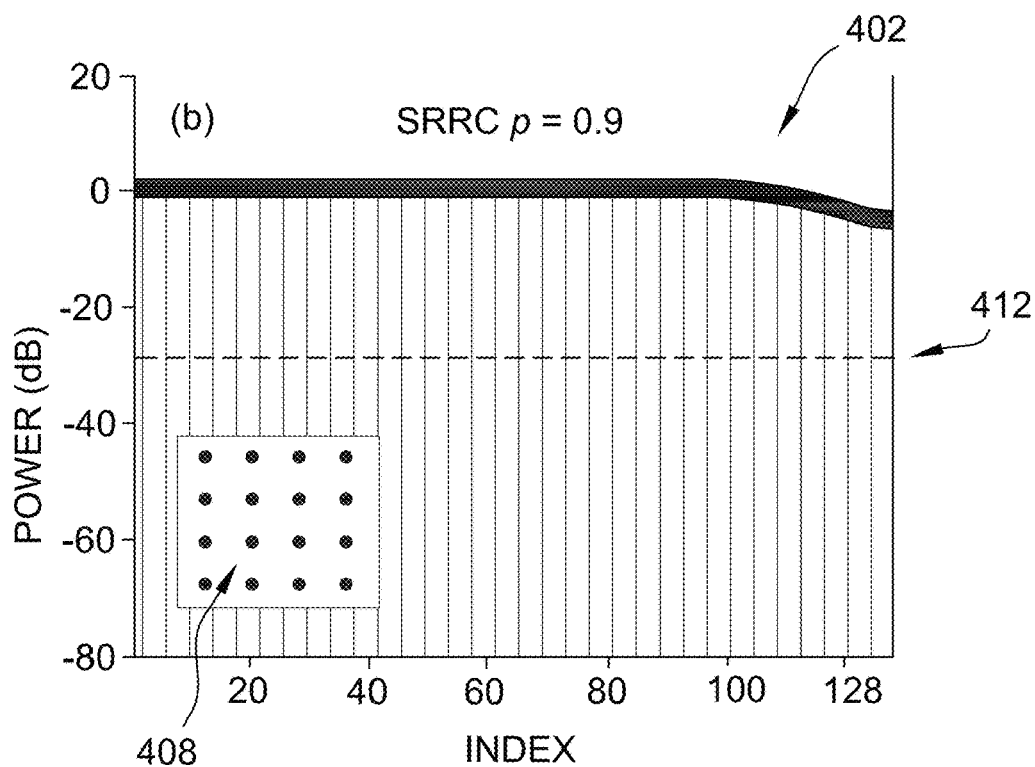
Figure 4C:
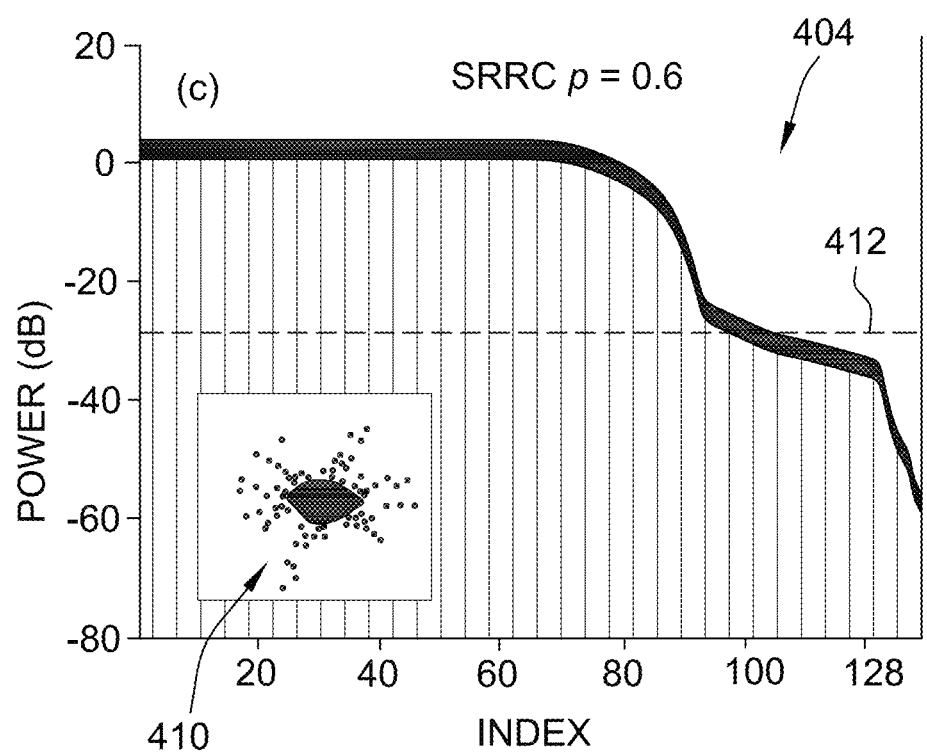

FIGS. 4A-C are graphical illustrations depicting eigenvalue distributions 400, 402, 404 of the channel matrix H obtained from pulse-shaping filter 120, FIG. 1. In an exemplary embodiment, each of eigenvalue distributions 400, 402, 404 may be obtained according to process 300, FIG. 3, using an SRRC function, and further correspond with a respective constellation 406, 408, 410 obtained after signal recovery. In the exemplary embodiments illustrated, the SRRC filter has a roll-off factor of 0.2, and each of distributions 400, 402, 404 is depicted against a threshold 412.

More particularly, in the examples illustrated in FIGS. 4A-C, eigenvalue distribution 400 is depicted for an FTN factor ρ=1, eigenvalue distribution 402 is depicted for an FTN factor ρ=0.9, and eigenvalue distribution 404 is depicted for an FTN factor ρ=0.6, and all three respective distributions are shown for a block size of 128. However, these parameters are used for illustrative purposes, and not in a limiting sense. Other FTN factors and block sizes may be implemented within the scope of the present embodiments.

From a comparison of distributions 400, 402, 404, it may be observed that, for an FTN factor ρ of 1 (e.g., FIG. 4A), the corresponding distribution 400 remains relatively stable across the index. However, as the FTN factor ρ is reduced (e.g., FIGS. 4B, 4C), the eigenvalues are shown to be more unevenly distributed across the index, and approaching zero at the smallest values thereof. A comparison of constellation 410 with constellation 406 further illustrates an effect of reducing the FTN factor ρ. As demonstrated from the exemplary embodiments depicted in FIGS. 4A-C, the channel matrix H nearly approximates a singular matrix. Accordingly, the signal quality of the transmission will be reduced when information is carried by those degenerated dimensions with significantly small eigenvalues.

Figure 5A:
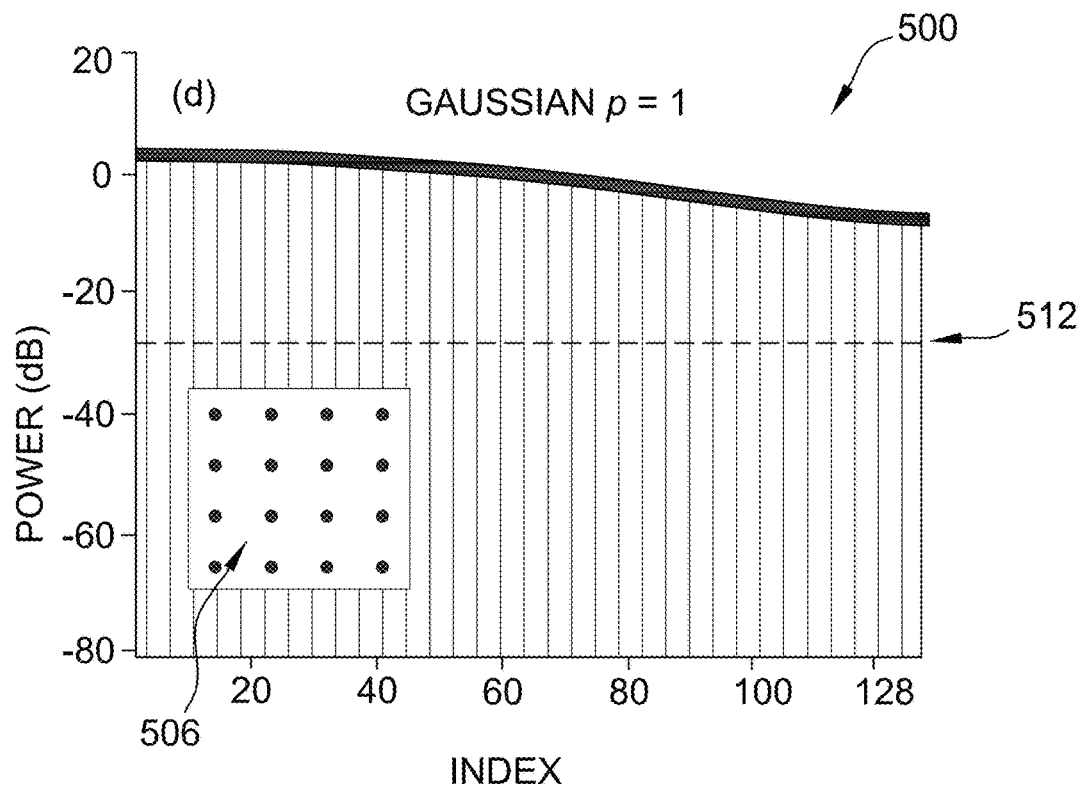
FIGS. 5A-C are graphical illustrations depicting eigenvalue distributions obtained from the pulse-shaping filter depicted in FIG. 1, using a Gaussian function.
Figure 5B:
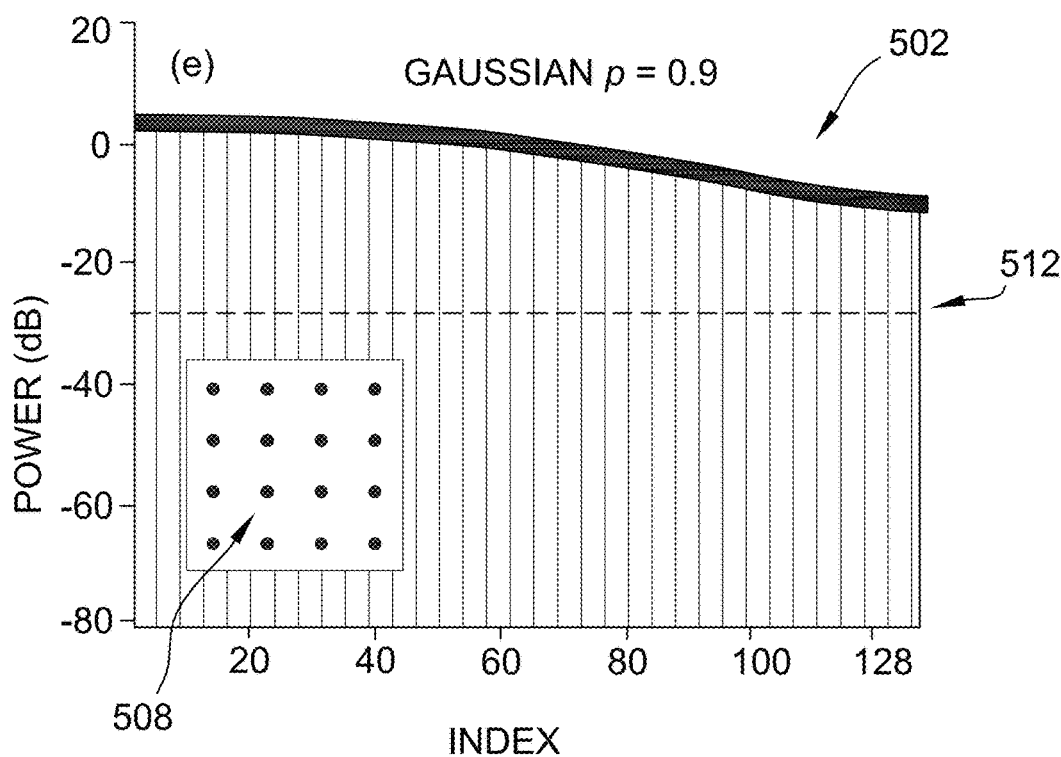
Figure 5C:
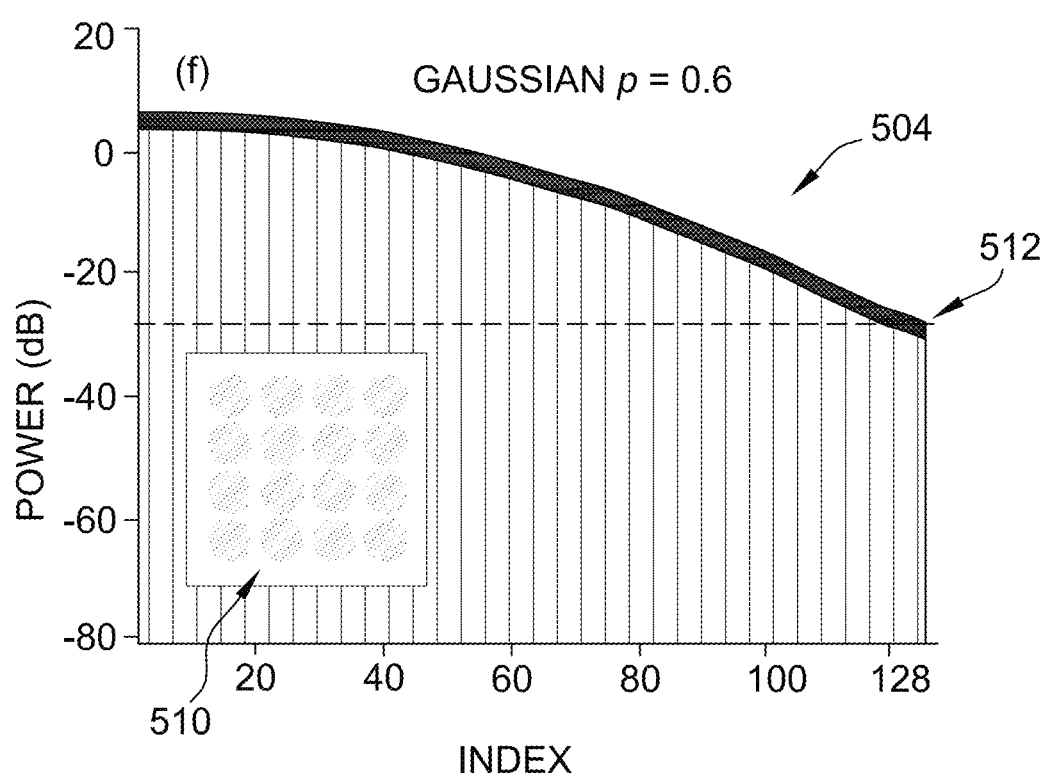

FIGS. 5A-C are graphical illustrations depicting eigenvalue distributions 500, 502, 504 of the channel matrix H obtained from pulse-shaping filter 120, FIG. 1, and corresponding constellations 506, 508, 510 obtained after signal recovery (i.e., FTN factors ρ=1, ρ=0.9, ρ=0.6, respectively). Distributions 500, 502, 504 are therefore similar to distributions 400, 402, 404, FIGS. 4A-C, except that each of distributions 500, 502, 504 implements a filter having Gaussian function instead of an SRRC function. In the exemplary embodiments illustrated, the Gaussian filter has a 20-dB bandwidth and 1.2 times of Nyquist bandwidth, and each of distributions 500, 502, 504 is depicted against a threshold 512.

A comparison of Gaussian-filtered eigenvalue distributions 500, 502, 504 with their SRRC-filtered counterparts 400, 402, 404, respectively, demonstrates how Gaussian filters function more robustly against channel degradation caused by FTN-induced ISI. The difference between the respective filters is further illustrated by comparing constellation 510 (Gaussian) with constellation 410 (SRRC). The respective eigenvalue distributions illustrated in FIGS. 4A-C and 5A-C thus further demonstrate practical results achieved according to the advantageous techniques provided through implementation of process 300, FIG. 3, to obtain the smallest value for the FTN factor ρ while maintaining eigenvalues above thresholds 412, 512.

In an exemplary embodiment, the algorithm(s) implemented within process 300 are not limited to only minimizing the value of the FTN factor ρ. Indeed, according to the advantageous embodiments described herein, the respective algorithm(s) may be further configured to utilize the channel eigenvalue distribution to improve the convergence speed to search for the value (e.g., optimal value) of the FTN factor ρ. Additionally, the present systems and methods may flexibly implement different computational efficient matrix decomposition methods instead of SVD, and/or use other improved or dynamic channel estimation methods instead of MMSE or CMA.

FIG. 6 is a schematic illustration of an architecture 600 of an linear time-invariant (LTI) model. In the example illustrated in FIG. 6, LTI model architecture 600 is implemented with respect to a PAM-4 IMDD system. In an exemplary embodiment, LTI model architecture 600 includes a first input stream of initial symbols 602 (e.g., $x_1$~$x_N$, including ZPs) and a second input stream of precoded symbols 604 (e.g., $\alpha_1$~$\alpha_N$, including ZPs), where α=Lx, as described above. In an exemplary embodiment, second input stream 604 is obtained by processing first input stream 602 according to a precoding process (e.g., precoding process 700, described further below with respect to FIG. 7). In at least one embodiment, first input stream 602 is mapped (e.g., by symbol mapping unit 114, FIG. 1) prior to precoding.

Further in the exemplary embodiment, architecture 600 is similar in structure and function to architecture 100, FIG. 1, in that architecture 600 includes a preliminary stage 606 and a secondary stage 608. Preliminary stage 606 includes a transmitter pulse shaper 610 (e.g., s(t)) and a channel 612 (e.g., C(f); c(t)). In at least one embodiment, an output signal from channel 612 is combined with a noise signal 614 at a combiner 616, and this combined signal is transmitted to secondary stage 608. Secondary stage 608 includes a receiver matched filter 618 (e.g., g(t)) and output unit 620 configured to output a stream of symbols y(n). Output unit 620 may, for example, include one or more of a downconverter, and equalizer, a decoder, and a symbol demapper (not shown in FIG. 6). The precoding DSP techniques performed at the transmitter site are described further below with respect to FIG. 7.

FIG. 7 is a flow diagram for an exemplary precoding process 700 for architecture 600, FIG. 6. Precoding process 700 includes a matrix generation subprocess 702, a matrix decomposition subprocess 704, and a precoding subprocess 706. In an exemplary embodiment, incoming PAM-4 symbols are initially organized into blocks of data (e.g., frame structure 200, FIG. 2) to form first input stream 602. In this example, each block contains 256 symbols (i.e., N=256) and a plurality of ZPs respectively inserted between adjacent blocks (e.g., each ZP may be 4 symbols wide) to prevent ISI from transferring between blocks.

In subprocess 702, precoding process generates the LTI channel matrix H. Similar to architecture 100, FIG. 1, the respective time responses of the pulse shaper, channel, and matched filter may again be denoted as s(t), c(t), and g(t)=s*(T−t), and this LTI model also denotes the input symbols x and the output symbols y (related by y=Hx+z) and the LTI channel matrix H of elements $h_{ij}$=s(t)*c(t)* g(t)$|_{t=(i-j)\tau}$, where τ represents the symbol period.

Accordingly, in this example, the LTI channel matrix H may be represented as:

$$H=[h_{ij}] \qquad (Eq.\ 4)$$

Similarly, whether parameter c(t) is not considered, the LTI channel matrix may alternatively be designated by M, and referenced as:

$$M=[m_{ij}] \qquad (Eq.\ 5)$$

where $m_{ij}$ denotes the elements of the matrix M, according to:

$$m_{ij}=s(t)*g(t)|_{t=(i-j)\tau} \qquad (Eq.\ 6)$$

Figure 8:
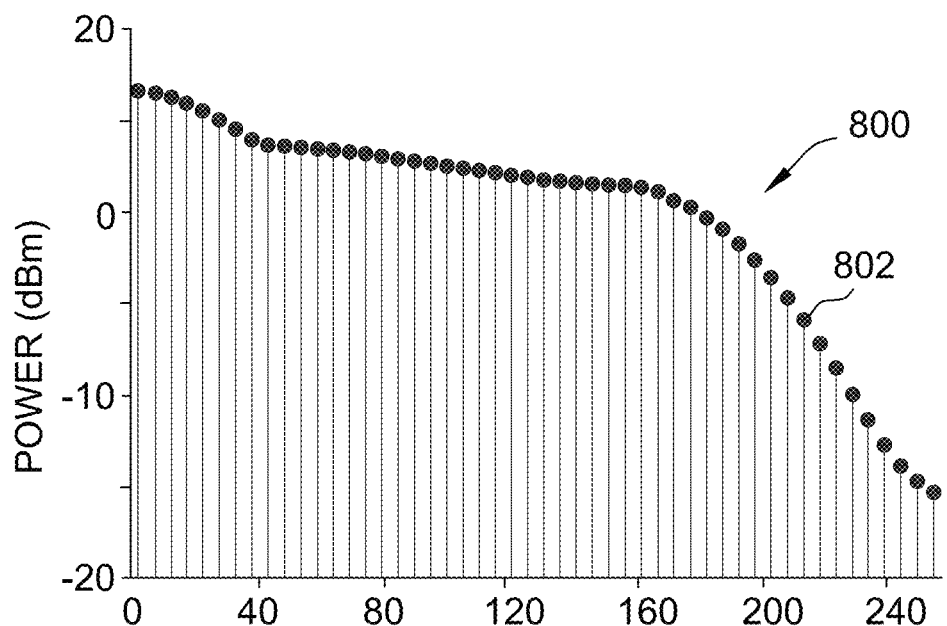
FIG. 8 is a graphical illustration depicting an eigenvalue distribution of a channel matrix generated according to the process depicted in FIG. 7.

After generating one or more LTI matrices in subprocess 702, process 700 executes matrix decomposition subprocess 704, in which process 700 functions to decompose the channel into N orthogonal subsets, and the $i^{th}$ element of the resulting eigenvalue matrix, Λ, that is, denoted herein as $\Delta_i$, functions to indicate the strength of the system response toward the $i^{th}$ subset of the N orthogonal subsets. The Cholesky decomposition may be represented as [θ,Φ]=chol ($M^{-1}$). Accordingly, the eigenvalue matrix Λ is a diagonal matrix denoted as Λ=diag($\lambda_i$), and along with a complex unitary matrix U such that (θHΦ)'(θHΦ)=UΛU'. The distribution of the eigenvalues is illustrated in FIG. 8, described further below.

In precoding subprocess 706, an MBER water filling algorithm, for example, is used is implemented as a basis for generating a new diagonal matrix, D=diag($d_i$), from the distribution of eigenvalue matrix elements $\lambda_i$. From these values, the probability of symbol error, $p_e$, may be calculated for each subset. Under PAM-L modulation, the symbol error $p_e$ is represented according to:

$$p_e = \frac{2(L-1)}{L} \text{erf}\left(\sqrt{\frac{E_s \lambda_i d_i}{2N_0(L-1)^2}}\right) \qquad (Eq.\ 7)$$

Thus, using the symbol error $p_e$, in precoding subprocess 706, min $\{1-\Pi_i(1-p_e(\lambda_i,d_i))\}$ is subject to:

$$\Sigma_i|d_i|^2=P_{tot} \qquad (Eq.\ 8)$$

and in the case where L=θU$D^{1/2}$U', and also where α=Lx.

FIG. 8 is a graphical illustration depicting an eigenvalue distribution 800 of a channel matrix (e.g., channel matrix H) generated according to process 700, FIG. 7. As described above with respect to FIG. 7, distribution 800 demonstrates that, because the eigenvalues are real-valued, as N tends to infinity, the distribution curve 802 of the channel approaches the channel power response.

Figure 9:
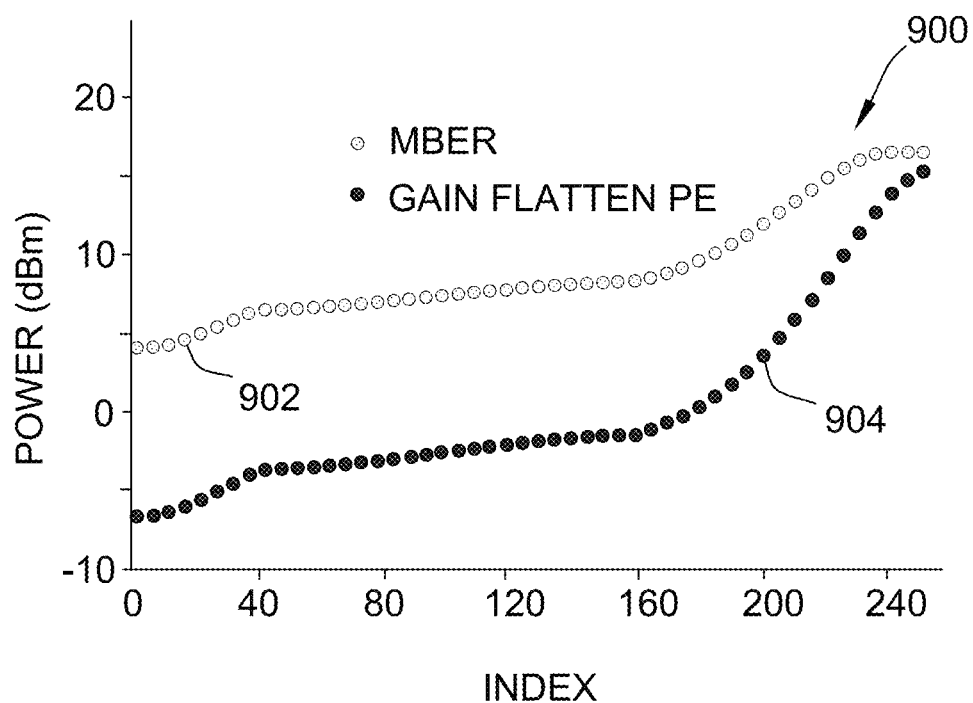
FIG. 9 is a graphical illustration depicting an eigenvalue distribution of a precoding matrix generated according to the process depicted in FIG. 7.

FIG. 9 is a graphical illustration depicting an eigenvalue distribution 900 of a precoding matrix (e.g., precoding matrix L) generated according to process 700, FIG. 7. In an exemplary embodiment, process 700 is configured to utilize a set of approximations and/or a Lagrange multiplier such that the optimized diagonal entry $d_i$ may be calculated and distributed according to MBER distribution curve 902. For illustrative purposes, a second distribution curve 904 is plotted along with MBER distribution curve 902 to demonstrate the comparative $d_i$ distribution using MBER water-filling techniques (i.e., curve 902) against conventional PE techniques (i.e., curve 904), which are shown to flatten the gain spectrum of the conventional eigenvalues.

As demonstrated by this comparison, the advantageous processes and subprocesses of the present embodiments achieve significant advantage over conventional techniques. Specifically, as illustrated in FIG. 9, in comparison with the innovative MBER techniques described herein, the conventional PE techniques demonstrate a significant power sacrifice at low-frequency components, while also reducing the average signal-to-noise ratio (SNR), which thereby increases the overall symbol error rate. According to the present systems and methods though, the particular MBER water-filling algorithms described herein enable the optimization of the eigenvalue distribution to meet target criteria for minimizing the symbol error rate.

Figure 10:
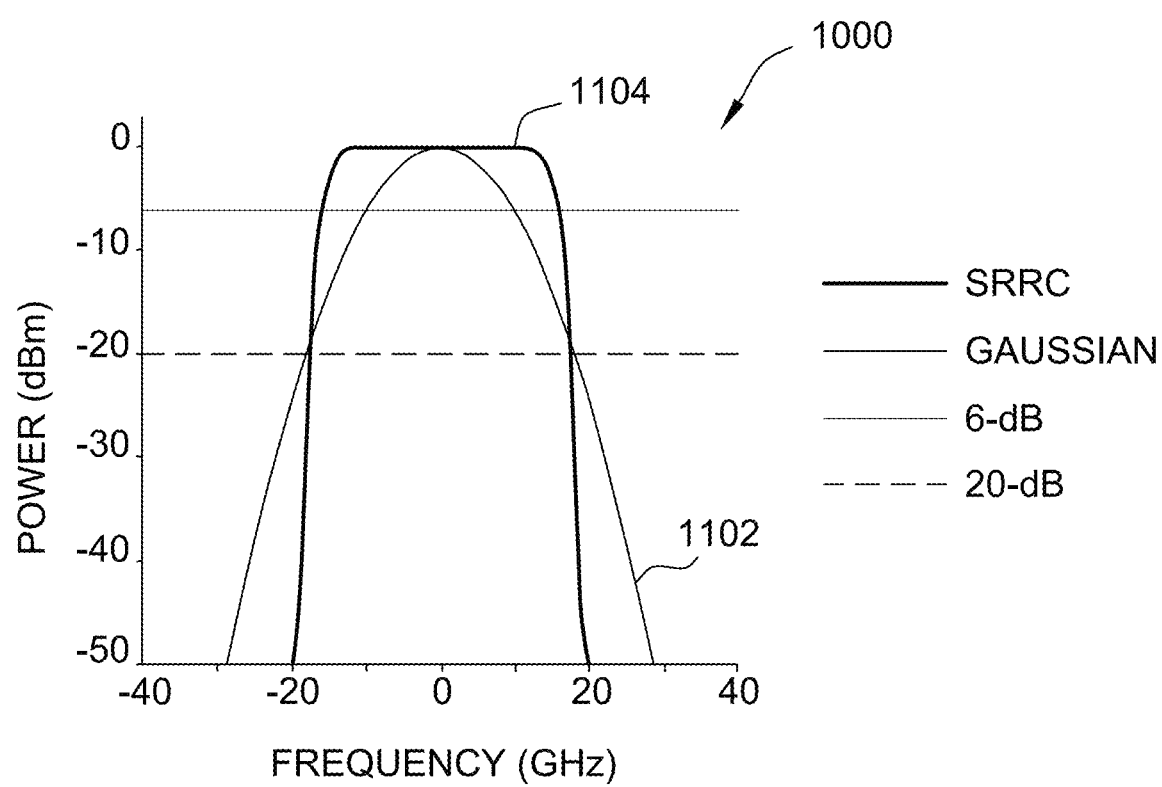
FIG. 10 is a graphical illustration depicting a comparative result between a spectral distribution of a Gaussian filter with a spectral distribution of a square-root raised cosine filter.

FIG. 10 is a graphical illustration depicting a comparative result 1000 between a first spectral distribution 1102 of a Gaussian filter and a second spectral distribution 1104 of an SRRC filter. In an exemplary embodiment, a precoding process (e.g., precoding subprocess 706, FIG. 7) multiplies the precoding matrix L with the symbol vector x within each data block (e.g., data block 204, FIG. 2). In this embodiment, Gaussian functions/filters may be implemented at both the pulse shaper (e.g., a transmitter pulse shaper 120, FIG. 1, 610, FIG. 6) and the corresponding matched filter (e.g., receiver matched filter 126, FIG. 1, 618, FIG. 6). That is, corresponding Gaussian filters are provided at both the preliminary stage transmitter and the preliminary stage receiver. In contrast with the broader-spectrum Gaussian spectral distribution 1102, SRRC spectral distribution 1104 demonstrates a more limited bandwidth that prevents the system from utilizing the full spectrum beyond its Nyquist limit.

Figure 11A:
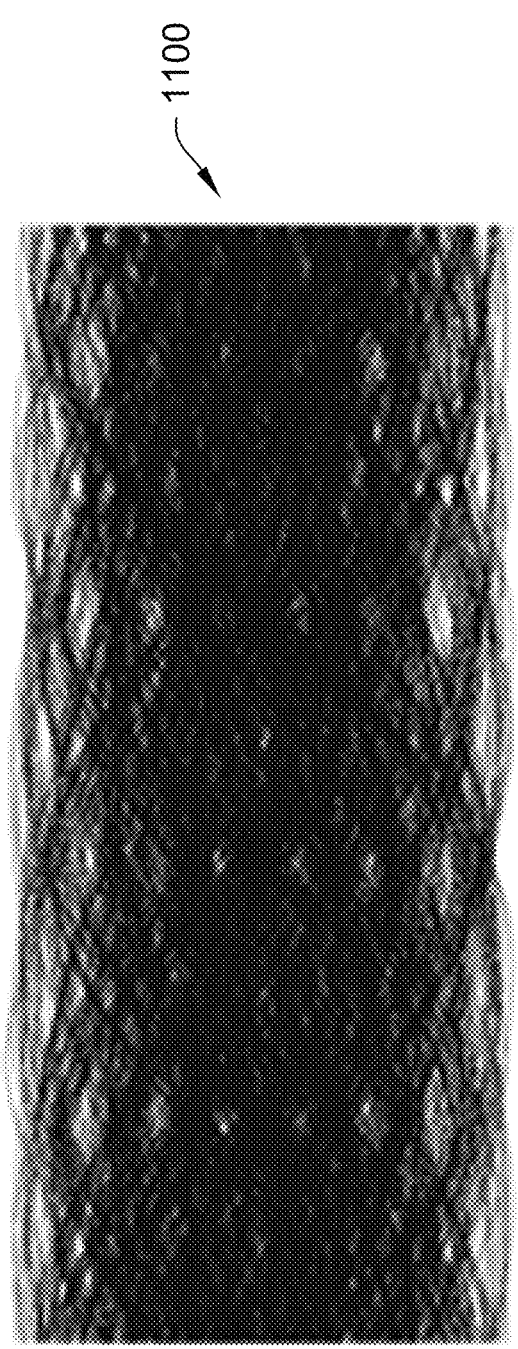
FIGS. 11A-B are graphical illustrations depicting PAM-4 eye diagrams before and after precoding, respectively, according to an embodiment.
Figure 11B:
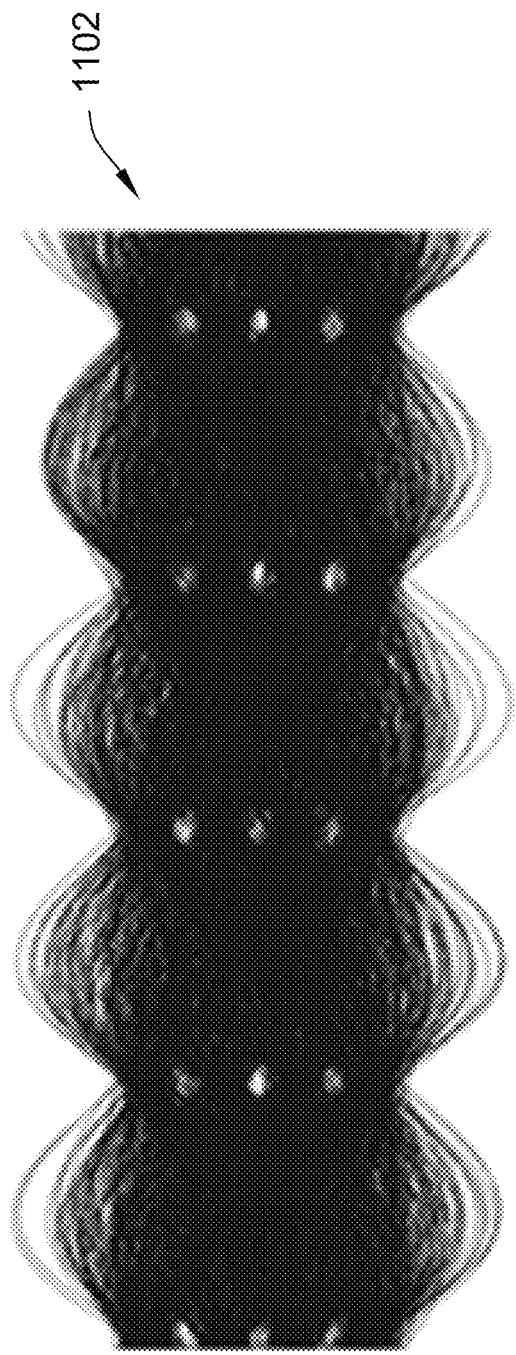

FIGS. 11A-B are graphical illustrations depicting PAM-4 eye diagrams 1100 and 1102 before and after precoding, respectively. In an exemplary embodiment, eye diagrams are recovered from data measured before and after implementation of precoding. In this example, eye diagrams 1100, 1102 illustrate pictoral results from Gaussian pulses having a symbol rate 1.67 times of the full-width-at-half-maximum (FWHM), in the frequency domain. As illustrated in FIG. 11A, prior to precoding, eye diagram 1100 appears duobinary-like, mainly due to the NF effect and increased ISI. However, after precoding, eye diagram 1102 exhibits significantly enlarged eye openings. In some cases, the enlarged eye openings are achieved at an expense of a slight reduction to the average power.

Figure 12A:
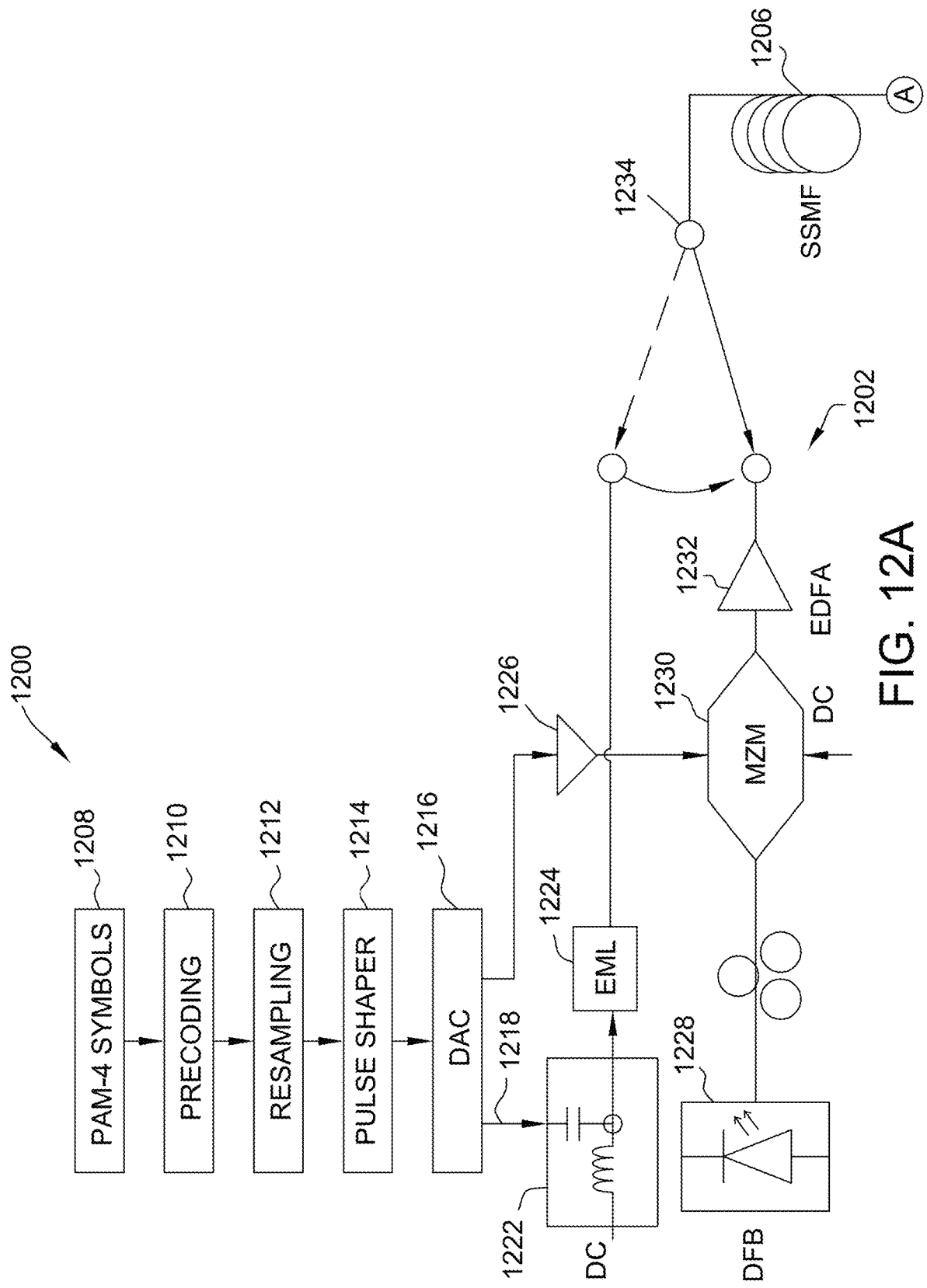
FIGS. 12A-B represent a schematic illustration of an optical system configured to implement the precoding process depicted in FIG. 7.
Figure 12B:
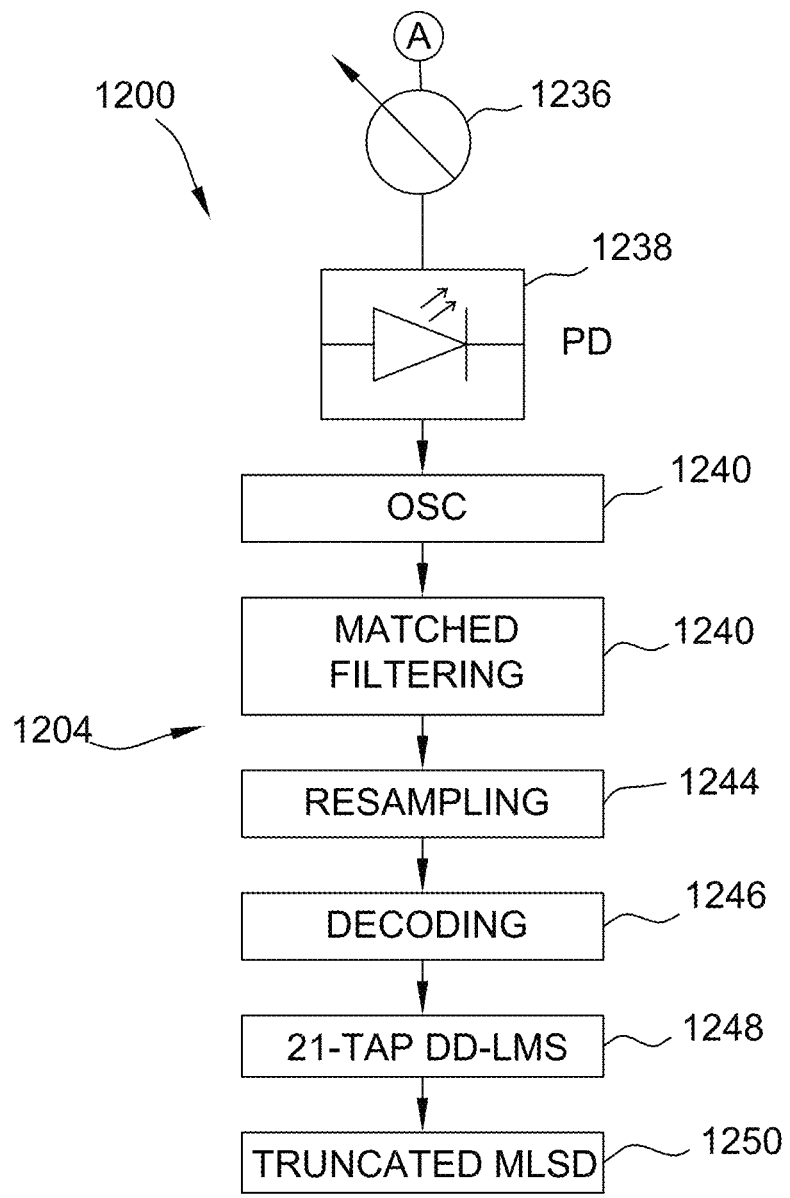

FIGS. 12A-B represent a schematic illustration of an optical system 1200 configured to implement precoding process 700, FIG. 7. Optical system 1200 may be similar to system 102, FIG. 1, and individual components thereof, whether hardware or software-based, may have a similar structure and/or functionality to similarly-labeled components described above. In an exemplary embodiment, optical system 1200 implements DSP operations for both a transmitter site 1202 (e.g., FIG. 12A, preliminary stage), and for a receiver site 1204 (e.g., FIG. 12B, secondary stage), which communicate, for example, over an optical fiber 1206 (e.g., a standard single mode optical fiber (SSMF)).

In an embodiment, transmitter site 1202 includes one or more of a symbol generator 1208, a precoder 1210, an up-sampler 1212, a pulse shaper 1214, and a DAC 1216. An output from DAC 1216 may feed into one or both of an integrated laser structure 1218 and a distributed feedback (DFB) laser structure 1220. Integrated laser structure 1218 may, for example, include a modulator 1222 (e.g., an electro-absorption modulator (EAM)) and a laser 1224 (e.g., an electro-absorption modulated laser (EML)). DFB laser structure 1220 may, for example, include a driver 1226, a DFB laser diode 1228, an electro-optic modulator 1230 (e.g., a Mach-Zender modulator (MZM)), and an amplifier 1232 (e.g., an erbium-doped fiber amplifier (EDFA)). In some embodiments, system 1200 further includes a switch 1234 configured to select between respective outputs of one or both of integrated laser structure 1218 and a DFB laser structure 1220.

In an embodiment, receiver site 1204 includes one or more of an optical attenuator 1236 (e.g., a variable optical attenuator (VOA)), a receiving photodiode 1238, a converter 1240 (e.g., an ADC, oscilloscope, sampler etc.), a matched filter 1242, a down-sampler 1244, a decoder 1246, an equalizer 1248 (e.g., 21-*tap* DD-LMS), and an MLSE unit 1250 (e.g., including a truncated MLS detector (MLSD)).

In exemplary operation of system optical 1200, at transmitter site 1202, symbol generator 1202 is configured to generate a sequence of PAM-4 symbols. MBER precoding is applied to the generated sequence by precoder 1210, and resampling is applied to the sequence by up-sampler 1212. The precoded symbols may then be pulse shaped by pulse shaper 1214 and sent to DAC 1216 before being modulated onto an optical light signal. After transmission over fiber 1206, the received optical signal is converted to the electrical domain and sampled by converter 1240. The processed electrical domain blocks may then be processed by matched filter 1242 (e.g., by a Gaussian function) and then down-sampled by down-sampler 1244 into a 1 sample per symbol format. Decoder 1246 may then be configured to multiply each data block with a decoding matrix, and equalizer 1248 may be applied to eliminate residual ISI. In an exemplary embodiment, MLSE unit 1250 applies a truncated MLSE to the equalized data blocks in the soft-decision decoder. In at least one embodiment, the truncated MLSE is applied with a depth of 2.

Figure 13:
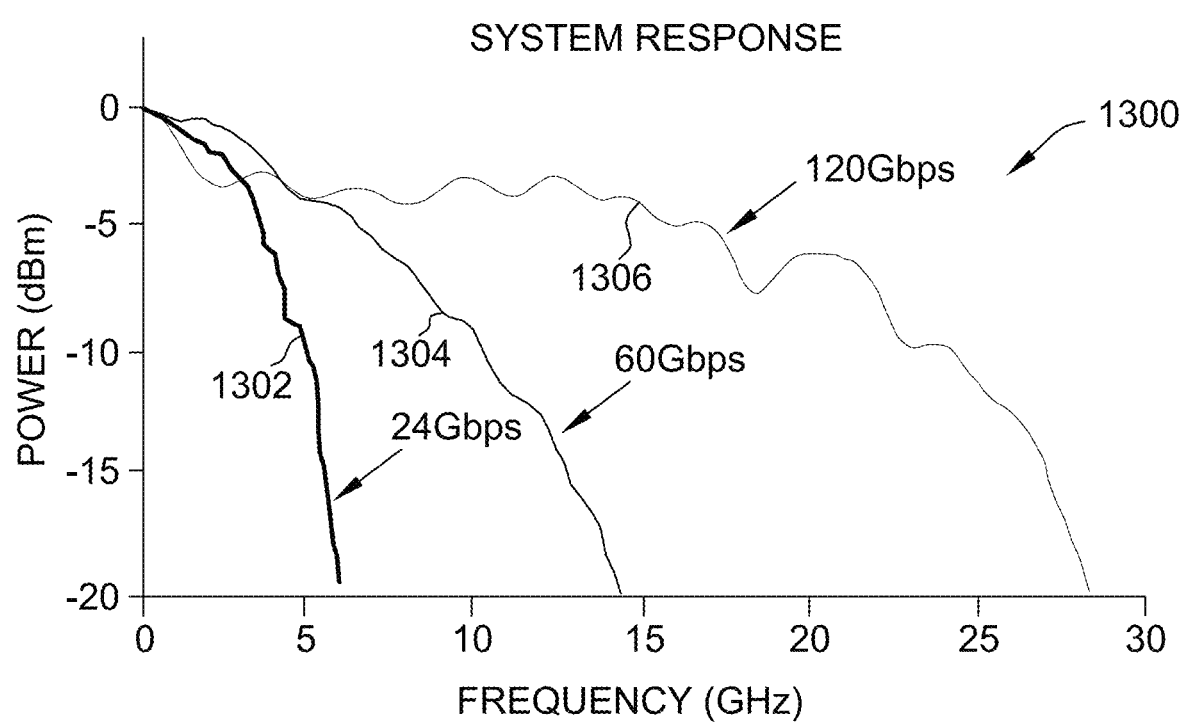
FIG. 13 is a graphical illustration depicting a system response of the system depicted in FIGS. 12A-B.

FIG. 13 is a graphical illustration depicting a system response 1300 of system 1200, FIGS. 12A-B. More particularly, system response 1300 depicts, over frequency, a first power response 1302 for a transmission over system 1200 at 24 Gbps, a second power response 1304 for a transmission over system 1200 at 60 Gbps, and a third power response 1306 for a transmission over system 1200 at 120 Gbps. From these examples illustrated in FIG. 13, it can be further observed, when seen together with FIGS. 14A-C, below, how the system performance subjected to NF effects will change for different bandwidths, different combinations of transmitters and receivers (e.g., 1202 and 1204), and different lengths of fiber (e.g. fiber 1206).

Figures 14A, 14B, 14C:
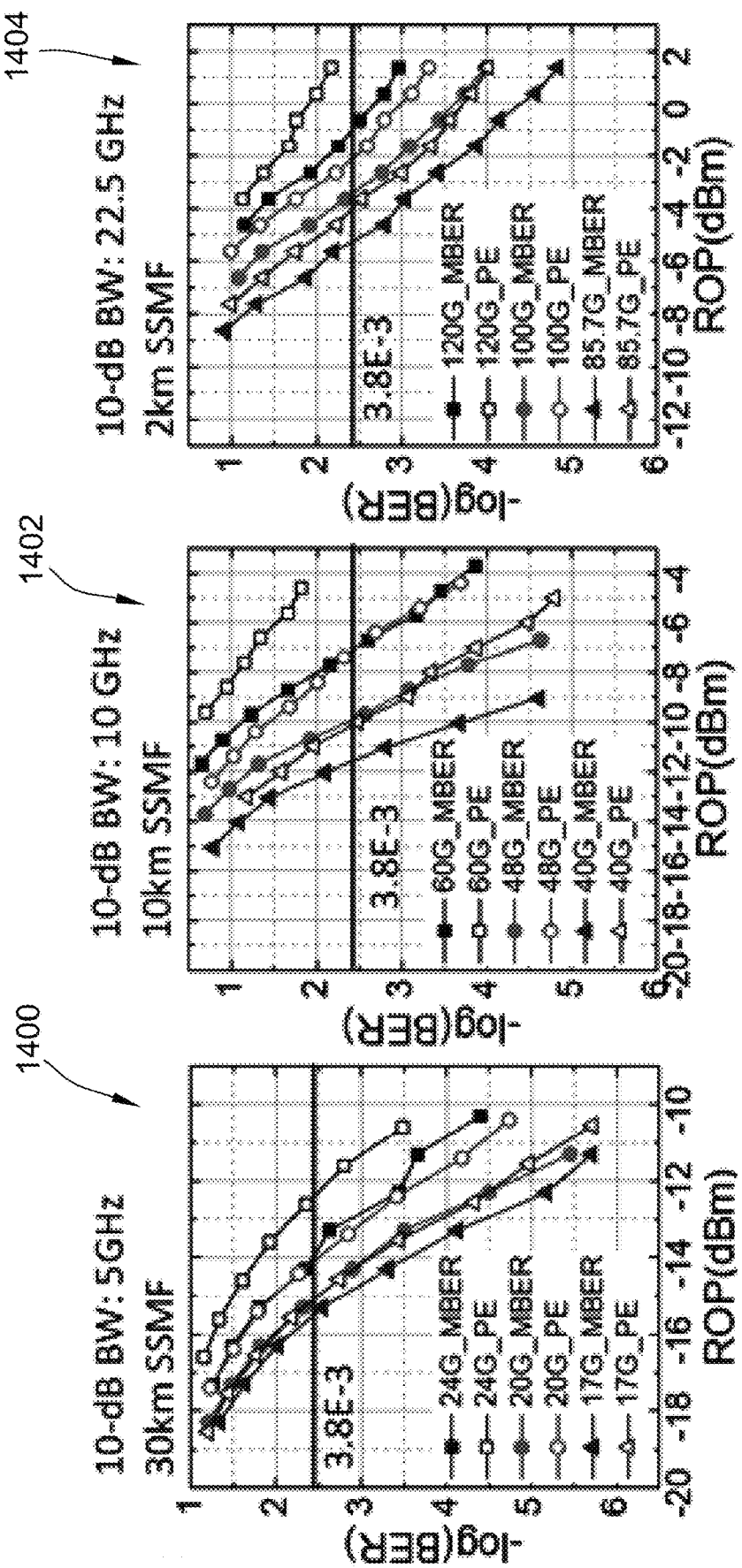
FIGS. 14A-C are graphical illustrations depicting selected bit error rate results of the system depicted in FIGS. 12A-B.

FIGS. 14A-C are graphical illustrations depicting selected BER results 1400, 1402, 1404 against received optical power (ROP, in dBm) of system 1200, FIGS. 12A-B. More particularly, FIG. 14A depicts measured BER results 1400 using a 10-GHz externally modulated laser (EML) at 1545.7 nm (e.g., laser 1224), a 10-GHz PIN detector (e.g., photodetector 1238), a 30-km SSMF (e.g., fiber 1206), and a 20-GSa/s digital oscilloscope (e.g., converter 1240). Similarly, FIG. 14B depicts measured BER results 1402 using a 10-km SSMF, a 20-GHz MZM (e.g., electro-optic modulator 1230), and a 40-GSa/s oscilloscope. In an exemplary embodiment of results 1402, the baud rate is increased from 20 to 30 GSa/s. FIG. 14C depicts measured BER results 1404 using a 2-km SSMF and a 40-GHz photodetector. In an exemplary embodiment of results 1404, the baud rate is upgraded to 43-60 GSa/s using, for example, an oscilloscope at 80GSa/s.

Accordingly, the embodiments depicted in FIGS. 13 and 14A-C demonstrate how, as the symbol rate increases (FIG. 13), the NF effect induced by the limited system bandwidth becomes stronger, which then incurs severe ISI and reduces the BER performance (FIGS. 14A-C). However, FIGS. 14A-C also demonstrate how the present MB ER eigenvalue-space precoding techniques achieve significant improvements over conventional PE schemes. Specifically, the present embodiments are shown to realize receiver sensitivity improvements greater than 3-dB, at bit rates of 60 Gbps and 120 Gbps, relative to the conventional PE techniques. The present embodiments enable adjustments to the pulse shape of the signal based on the innovative eigenvalue analysis and optimization operations described herein.

Additionally, the measured experimental results illustrated in FIGS. 13 and 14A-C still further demonstrate how the present systems and methods are capable of achieving significant upgrades to system capacity by increasing the symbol rate with simpler modulation formats, such as NRZ and PAM-4, instead of implementing more advanced modulation formats, such as PAM-8 or PAM-16, as conventionally known. The present embodiments therefore are able to advantageously utilize a significantly less complex decoder architecture with soft-decision functionality, a reduction in DAC resolutions, and a lower peak-to-average power ratio. Furthermore, with the present systems and methods, ISI impairments may still be mitigated, e.g., using advanced precoding and other DSP techniques, without having to sacrifice these other benefits.

Figure 15A:
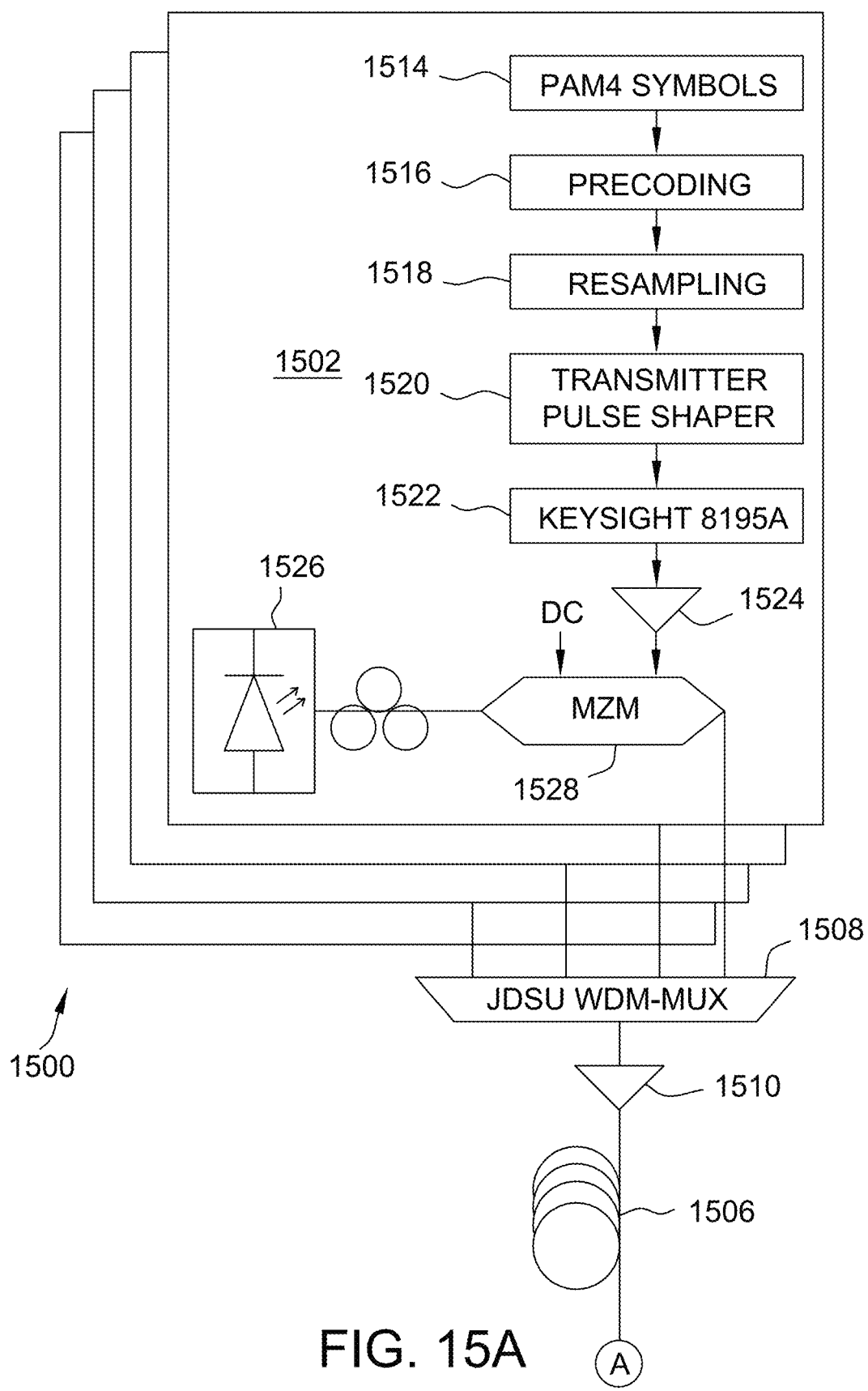
FIGS. 15A-B represent a schematic illustration of a testbed for an optical wavelength division multiplexing network, according to an embodiment.
Figure 15C:
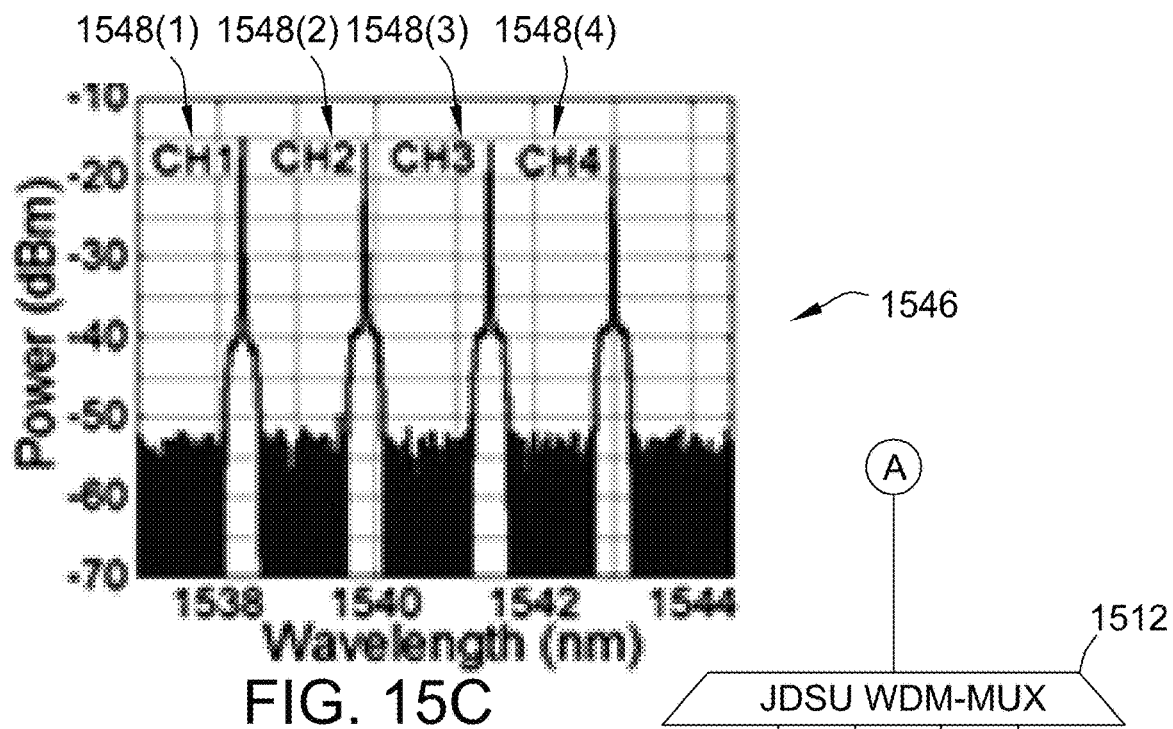
FIG. 15C is a graphical illustration depicting an optical spectrum for four channels utilized by the testbed depicted in FIGS. 15A-B.
Figure 15B:
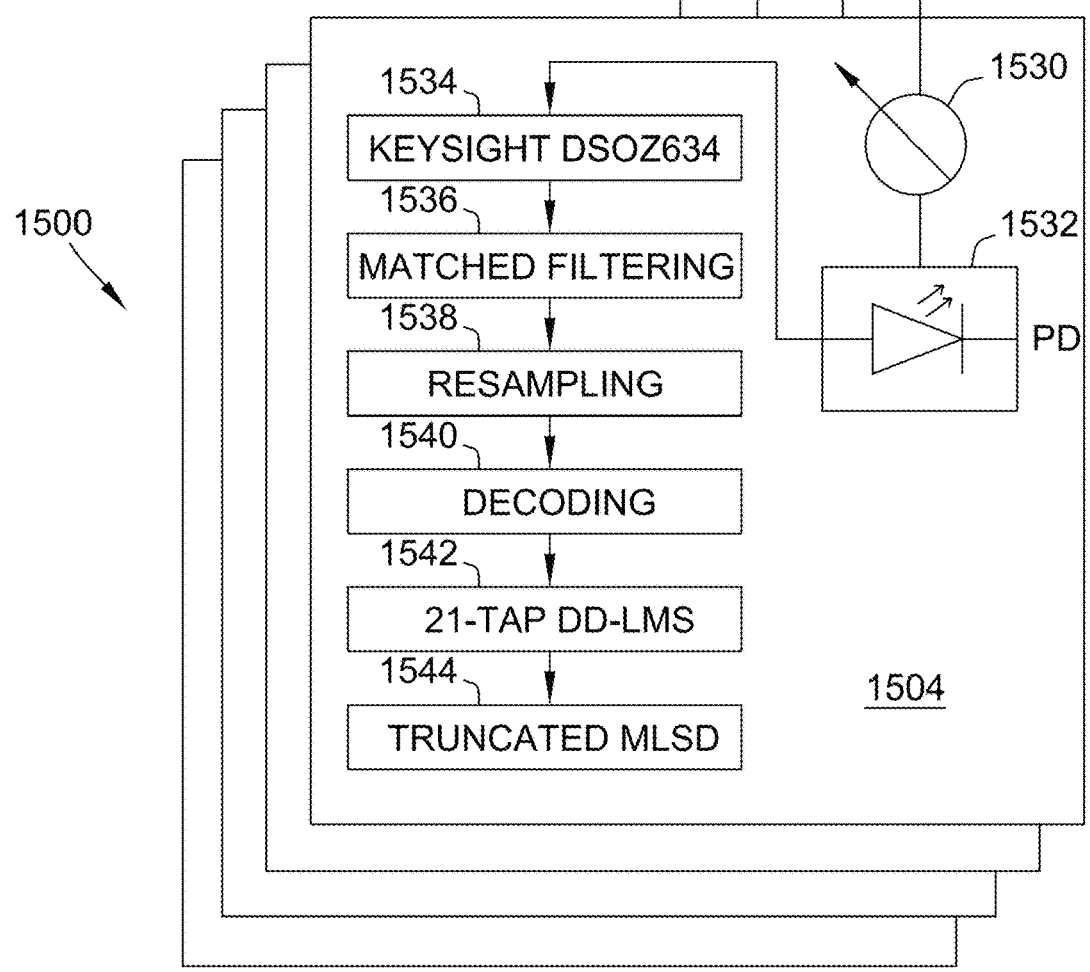

FIGS. 15A-B represent a schematic illustration of a testbed 1500 for an optical wavelength division multiplexing network. In an exemplary embodiment, testbed 1500 is similar to system 1200, FIG. 12, with respect to architecture and functionality, and represents a testing scheme of a four-lane PAM-4 WDM testbed having a plurality (e.g., one or more) of transmitter portions 1502 and receiver portions 1504 communicating over a fiber 1506. In the case where a transmitter portion 1502 represents a plurality of individual transmitters, the outputs from all of the individual transmitter portions 1502 are multiplexed onto fiber 1506 by multiplexer 1508, amplified by EDFA 1510, and then demultiplexed to individual respective receiver portions 1504 by demultiplexer 1512.

In an exemplary embodiment, each transmitter portion 1502 includes one or more of a symbol generator 1514, a precoder 1516, an up-sampler 1518, a pulse shaper 1520, a transmitter converter 1522 (e.g., a DAC and/or oscilloscope), a driver 1524, a DFB laser diode 1526, and an electro-optic modulator 1528 (e.g., an MZM). In a complementary fashion, each receiver portion 1504 includes one or more of an optical attenuator 1530, a photodetector 1532, a receiver converter 1534 (e.g., an ADC and/or oscilloscope), a matched filter 1536, a down-sampler 1538, a decoder 1540, and equalizer 1542, and an MLSE unit 1544 (e.g., truncated MLSD).

FIG. 15C is a graphical illustration depicting an optical spectrum 1546 for four channels 1548 utilized by testbed 1500, FIGS. 15A-B. In an exemplary operation of testbed 1500, a WDM laser array transmits over four wavelengths of optical spectrum 1546: (i) 1538.31 nm (i.e., channel 1548 (1), or CH1); (ii) 1539.87 nm (i.e., channel 1548(2), or CH2); (iii) 1541.44 nm (i.e., channel 1548(3), or CH3); and (iv) 1543.0 nm (i.e., channel 1548(4), or CH4). The PAM-4 signal(s) generated by signal generator 1514 may thus be externally modulated onto the light transmission using modulator(s) 1528. In the example illustrated in FIGS. 15A-C, the symbol rate is approximately 50 GSa/s for each channel 1548, with a total capacity reaching up to 400 Gbps, and the length of fiber 1506 is a 2 km.

Figure 16:
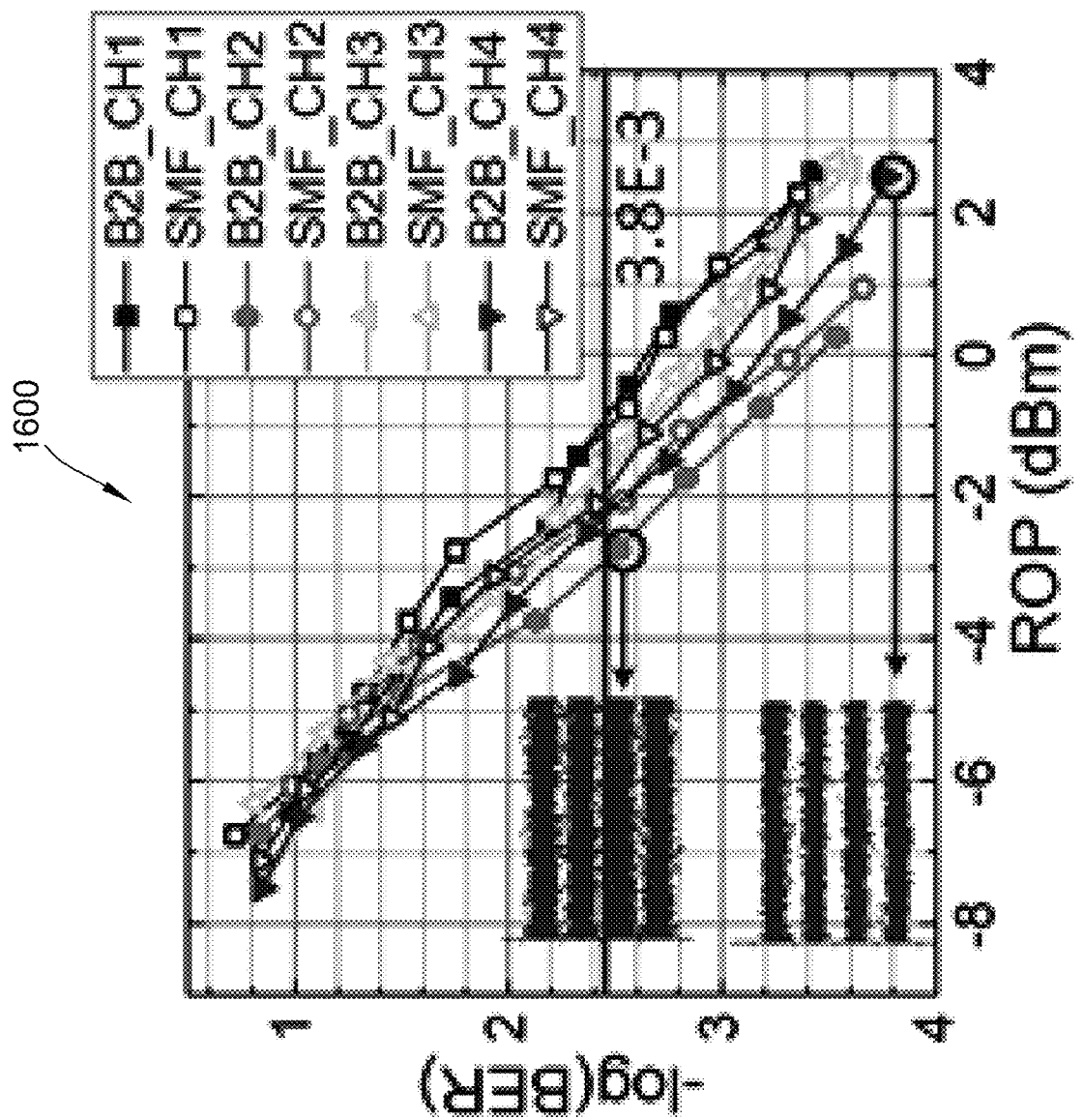
FIG. 16 is a graphical illustration of a plot depicting bit error rate performance versus receiver optical power for the channels depicted in FIG. 15C.

FIG. 16 is a graphical illustration of a plot 1600 depicting BER performance versus receiver optical power for channels 1548, FIG. 15C. Plot 1600 is therefore similar to results 1400, 1402, 1404 depicted in FIG. 14A, 14B, 14C, respectively. Plot 1600 differs though, in that instead of comparing performance of the present MBER techniques against conventional PE techniques, plot 1600 illustrates a comparison of BER performance through direct back-to-back (B2B) transmission between the transmitter portion 1502 and receiver portion 1504, against BER performance in consideration of the transmission channel of fiber 1506. As illustrated in plot 1600, the BER performances of the respective 4 channels 1548 exhibit BER thresholds of 3.8E-3 (7% hard decision decoding forward error correction (HD-FEC)) which may be passed, thereby allowing system margins of approximately 3.2-4.8 dB. Plot 1600 further demonstrates that a penalty of approximately 1-dB results after the fiber transmission (i.e., from SMF).

The systems and methods described herein disclose an innovative blockwise precoding technique that is advantageously based on system eigenvalue space analysis and optimization to mitigate the NF effects in FTN systems, and with multi-level modulations. Specifically, replication of the several precoding the embodiments described herein, in PAM-4 systems ranging from 24 Gbps to 120 Gbps, the receiver sensitivity is improved by approximately 2.5-dB, on average, when compared with conventional gain-flattening PE techniques. The embodiments described above further demonstrate the applicability of innovative techniques herein to a variety of optical systems, including without limitation, a WDM 4×100-Gbps PAM-4 link for inter-datacenter connects.

Exemplary embodiments of systems and methods for precoding in multi-level transmissions and FTN operations are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for an optical network, comprising:
 a transmitter portion configured to (i) generate an eigenvalue channel matrix for an input digitized stream of symbols based on a communication channel of the optical network, (ii) decompose the communication channel into a plurality of orthogonal subsets, (iii) precode the input digitized stream of symbols into a precoded symbol stream based on elements from the generated eigenvalue matrix, (iv) shape the precoded symbol stream according to a distribution function, and (v) transmit the shaped symbol stream over a digital communication link;
 a receiver portion configured to (i) recover the shaped symbol stream from the digital communication link, (ii) decompose eigenvalues of the eigenvalue channel matrix from the recovered symbol stream, and (iii) decode the decomposed symbol stream into an output symbol stream.

2. The system of claim 1, wherein the transmitter portion comprises an analog-to-digital converter configured to digitize an input analog signal into the input digitized stream of symbols.

3. The system of claim 1, wherein the transmitter portion comprises a mapping unit configured to code the input digitized stream of symbols with a mapping code prior to precoding.

4. The system of claim 1, wherein the input digitized stream of symbols comprises a PAM-4 signal format.

5. The system of claim 1, wherein the transmitter portion further comprises a pulse shaper configured to shape the precoded symbol stream according to a Gaussian function.

6. The system of claim 5, wherein the receiver portion comprises a matched filter configured to correspond to the Gaussian function of the pulse shaper.

7. The system of claim 1, wherein the transmitter portion further comprises a laser modulator configured to modulate the shaped symbol stream onto an optical light signal.

8. The system of claim 7, wherein the laser modulator comprises one of a distributed feedback laser and an integrated laser unit.

9. The system of claim 1, wherein the receiver portion comprises a decoder configured to multiply each data block of the recovered shaped symbol stream with a decoding matrix corresponding to the eigenvalue channel matrix.

10. The system of claim 1, wherein the receiver portion comprises at least one of an equalizer and a truncated maximum likelihood sequence unit.

11. The system of claim 10, wherein the equalizer comprises a decision-directed least-mean-square equalization unit.

12. The system of claim 10, wherein the truncated maximum likelihood sequence unit comprises one of a maximum likelihood sequence detector and a maximum likelihood sequence estimator.

13. A method for transmitting a digitized signal over a communication channel as a series of transmitted symbols having a distribution of symbol amplitude values, the method comprising the steps of:
 generating a channel matrix for the series of transmitted symbols based upon a time response of the communication channel;
 decomposing the communication channel into a plurality of orthogonal subsets;
 precoding the digitized signal according to an eigenvalue distribution of the channel matrix and the plurality of orthogonal subsets; and
 shaping the precoded digitized signal into the distribution of symbol amplitude values.

14. The method of claim 13, wherein the distribution of symbol amplitude values is according to a Gaussian function.

15. The method of claim 13, wherein the distribution of symbol amplitude values is according to a square-root raised-cosine (SRRC) function.

16. The system of claim 1, wherein the transmitter portion is further configured to decompose the communication channel using singular-value decomposition (SVD).

17. The method of claim 13, wherein the distribution of symbol amplitude values includes complex values.

18. A transmitter for an optical network, comprising:
 a processor configured to receive an input digitized stream of symbols; and
 a memory device including computer-executable instructions stored therein, which, when executed by the processor, cause the processor to:
 (i) generate an eigenvalue channel matrix for the input digitized stream of symbols based on a communication channel of the optical network;
 (ii) decompose the communication channel into a plurality of orthogonal subsets;
 (iii) precode the input digitized stream of symbols into a precoded symbol stream based on elements from the generated eigenvalue matrix;
 (iv) shape the precoded symbol stream according to a distribution function; and
 (v) transmit the shaped symbol stream over a digital communication link to a remote receiver, such that the remote receiver is enabled to recover the shaped symbol stream, decompose from the recovered symbol stream eigenvalues of the eigenvalue channel matrix, and decode the symbol stream using the decomposed eigenvalues.

* * * * *